(12) United States Patent
Knudsen

(10) Patent No.: US 11,015,367 B2
(45) Date of Patent: *May 25, 2021

(54) POST SLEEVE POSITIONING APPARATUS AND RELATED METHODS

(71) Applicant: N. Eric Knudsen, Maple Valley, WA (US)

(72) Inventor: N. Eric Knudsen, Maple Valley, WA (US)

(*) Notice: Subject to any disclaimer, the term of this patent is extended or adjusted under 35 U.S.C. 154(b) by 128 days.

This patent is subject to a terminal disclaimer.

(21) Appl. No.: 16/249,743

(22) Filed: Jan. 16, 2019

(65) Prior Publication Data

US 2019/0316379 A1 Oct. 17, 2019

Related U.S. Application Data

(63) Continuation of application No. 15/453,725, filed on Mar. 8, 2017, now Pat. No. 10,214,940.

(60) Provisional application No. 62/306,988, filed on Mar. 11, 2016.

(51) Int. Cl.
| | | |
|---|---|---|
| *G01B 5/14* | (2006.01) | |
| *E04H 17/26* | (2006.01) | |
| *E04H 12/34* | (2006.01) | |
| *G01B 21/16* | (2006.01) | |
| *G01C 5/00* | (2006.01) | |

(52) U.S. Cl.
CPC ......... *E04H 17/263* (2013.01); *E04H 12/347* (2013.01); *G01B 5/14* (2013.01); *G01B 21/16* (2013.01); *G01C 5/00* (2013.01)

(58) Field of Classification Search
CPC ............................. E04H 17/263; E04H 12/347

USPC .................................................. 33/613, 645
See application file for complete search history.

(56) References Cited

U.S. PATENT DOCUMENTS

| 422,104 A | 2/1890 | Yount |
|---|---|---|
| 978,505 A | 12/1910 | Stewart |
| 1,224,926 A | 5/1917 | Hindmarsh |
| 1,906,706 A | 5/1933 | Moore |
| (Continued) | | |

FOREIGN PATENT DOCUMENTS

| AT | 402 310 B | 4/1997 |
|---|---|---|
| EP | 0 153 545 A1 | 9/1985 |
| (Continued) | | |

OTHER PUBLICATIONS

Software Design Associates, "Computer Fencing System Unveils Version 6.0 Upgrade," URL=http://webcache.googleusercontent.com/search?q=cache:ZX33EIeYnQUJ:fenceweek.com/releases/sda_version_6_news.pdf+&cd=3&hl=en&ct=clnk&gl=us, download date Jun. 19, 2012, 1 page.

(Continued)

*Primary Examiner* — George B Bennett
(74) *Attorney, Agent, or Firm* — Seed Intellectual Property Law Group LLP

(57) ABSTRACT

A post sleeve installation system can include a plurality of post sleeve installation devices and at least one spacing beam or mechanism. The spacing beam or mechanism can include end portions that rotate about multiple independent axes and can be coupled to a pair of post sleeve installation devices to determine or control the relative locations and orientations between two post sleeves. The post sleeve installation system can be used to install post sleeves for posts for a fence, a rail or other structure supported by posts.

15 Claims, 16 Drawing Sheets

(56) References Cited

U.S. PATENT DOCUMENTS

| | | | |
|---|---|---|---|
| 2,028,680 A | 1/1936 | Mayeda et al. |
| 2,684,518 A | 7/1954 | Whitlock |
| 2,712,467 A | 7/1955 | Rice |
| 3,192,292 A | 6/1965 | Banks |
| 3,265,349 A | 8/1966 | Hamrick |
| 3,346,230 A | 10/1967 | Tolf, Jr. |
| 3,638,433 A | 2/1972 | Sherard |
| 3,638,741 A | 2/1972 | Zizak |
| 3,824,748 A | 7/1974 | Pichowicz |
| 3,837,127 A | 9/1974 | McMichael et al. |
| 3,876,970 A | 4/1975 | Schweitzer |
| 3,894,589 A | 7/1975 | Ciraud |
| 3,897,050 A | 7/1975 | Maloblocki |
| 4,077,599 A | 3/1978 | Oland |
| 4,079,912 A | 3/1978 | Haydock |
| 4,133,154 A | 1/1979 | Ruzicka |
| 4,479,342 A | 10/1984 | Eberle |
| 4,515,271 A | 5/1985 | Auciello et al. |
| 4,559,716 A | 12/1985 | Daughtry et al. |
| 4,625,415 A | 12/1986 | Diamontis |
| 4,634,316 A | 1/1987 | Cernak et al. |
| 4,688,969 A | 8/1987 | Bruser et al. |
| 4,726,561 A | 2/1988 | Worzala, Jr. |
| 4,773,195 A | 9/1988 | Waller |
| 4,787,601 A | 11/1988 | Rybak |
| 4,850,440 A | 7/1989 | Smet |
| 4,874,149 A | 10/1989 | Miceli |
| 4,926,785 A | 5/1990 | Lamson |
| 4,953,837 A | 9/1990 | Giroux |
| 4,986,373 A | 1/1991 | Charland et al. |
| 5,002,437 A | 3/1991 | Giroux |
| 5,040,251 A | 8/1991 | Hanford |
| 5,090,165 A | 2/1992 | Kenny |
| 5,090,656 A | 2/1992 | Brown |
| 5,156,755 A | 10/1992 | Cass |
| 5,165,663 A | 11/1992 | Wells |
| 5,315,796 A | 5/1994 | Gruhlke |
| 5,339,909 A | 8/1994 | Jenne et al. |
| 5,405,119 A | 4/1995 | Maguire |
| 5,491,905 A | 2/1996 | Jablonski et al. |
| 5,492,429 A | 2/1996 | Hodges |
| 5,542,481 A | 8/1996 | Scott |
| 5,594,669 A * | 1/1997 | Heger | G01C 9/06 33/343 |
| 5,632,464 A | 5/1997 | Aberle |
| 5,752,349 A | 5/1998 | Fitzsimmons et al. |
| 5,913,778 A | 6/1999 | Hying et al. |
| 5,961,249 A | 10/1999 | Hansen et al. |
| 5,992,103 A | 11/1999 | Norman et al. |
| 6,041,559 A | 3/2000 | Schickert et al. |
| 6,073,416 A | 6/2000 | Peter |
| 6,085,432 A | 7/2000 | Van der Sluis et al. |
| 6,098,351 A | 8/2000 | Mills |
| 6,098,353 A | 8/2000 | Stanfield |
| 6,267,688 B1 | 7/2001 | Morelli, Sr. |
| 6,273,657 B1 | 8/2001 | Vorona |
| 6,293,028 B1 | 9/2001 | Sylvia |
| 6,298,618 B1 | 10/2001 | Lawson |
| 6,308,926 B1 | 10/2001 | Meyer |
| 6,345,474 B1 | 2/2002 | Triplett |
| 6,389,760 B1 | 5/2002 | McDonnell |
| 6,621,417 B2 | 9/2003 | Duncan et al. |
| 6,658,753 B2 | 12/2003 | Tatarnic |
| 6,860,029 B2 | 3/2005 | Haynes |
| 6,886,296 B1 | 5/2005 | John et al. |
| 6,991,413 B2 | 1/2006 | Ballou et al. |
| 7,003,919 B2 | 2/2006 | Riker |
| 7,055,807 B2 | 6/2006 | Pesta |
| 7,069,160 B2 | 6/2006 | Cecil |
| 7,134,636 B2 | 11/2006 | Callies |
| 7,185,461 B2 | 3/2007 | Lapointe et al. |
| 7,185,720 B1 | 3/2007 | Menna |
| 7,191,573 B1 | 3/2007 | Newton, II |
| 7,219,872 B2 | 5/2007 | Walker |
| 7,325,790 B2 | 2/2008 | Lee |
| 7,377,489 B1 | 5/2008 | Houseman |
| 7,484,311 B2 | 2/2009 | Bommarito |
| 7,621,098 B2 | 11/2009 | Reinert, Sr. |
| 7,689,384 B1 | 3/2010 | Becker |
| 7,726,037 B1 | 6/2010 | Jordan |
| 7,861,434 B2 | 1/2011 | Knudsen |
| 7,954,289 B2 | 6/2011 | Evans |
| 7,966,740 B2 | 6/2011 | Knudsen |
| 8,011,149 B2 | 9/2011 | Knudsen |
| 8,109,006 B2 | 2/2012 | Knudsen |
| 8,307,565 B2 | 11/2012 | Knudsen |
| 8,347,514 B1 | 1/2013 | McCollum |
| 8,453,342 B2 | 6/2013 | Knudsen |
| 8,505,265 B2 | 8/2013 | McCollum |
| 8,756,824 B2 | 6/2014 | Knudsen |
| 8,893,444 B2 | 11/2014 | Richardson |
| 9,334,673 B2 | 5/2016 | Knudsen |
| 9,644,337 B1 | 5/2017 | Stiles et al. |
| 10,214,940 B2 * | 2/2019 | Knudsen | G01B 21/16 |
| 2001/0000548 A1 | 5/2001 | Niehaus |
| 2001/0034945 A1 * | 11/2001 | Smochek | G01C 9/26 33/373 |
| 2002/0007613 A1 | 1/2002 | Gordin et al. |
| 2002/0095813 A1 | 7/2002 | Tatarnic |
| 2002/0139069 A1 | 10/2002 | Buffkin et al. |
| 2002/0170189 A1 | 11/2002 | Cheatham |
| 2004/0134146 A1 | 7/2004 | Brown |
| 2005/0005468 A1 | 1/2005 | Wixey |
| 2005/0241263 A1 | 11/2005 | Van Rijn |
| 2006/0010703 A1 | 1/2006 | Gauthier |
| 2006/0190228 A1 | 8/2006 | Johnson |
| 2006/0243808 A1 | 11/2006 | Burlando |
| 2007/0036938 A1 | 2/2007 | Engelbrecht |
| 2007/0119067 A1 | 5/2007 | MacKey |
| 2008/0126022 A1 | 5/2008 | Hoguet |
| 2009/0090836 A1 | 4/2009 | Harris |
| 2009/0119941 A1 | 5/2009 | Sentz |
| 2009/0152783 A1 | 6/2009 | Sigler et al. |
| 2010/0229415 A1 * | 9/2010 | Knudsen | E04H 12/2284 33/613 |
| 2011/0161054 A1 | 6/2011 | Woolf et al. |
| 2011/0196661 A1 | 8/2011 | Spicola et al. |
| 2011/0320182 A1 | 12/2011 | Dommisse et al. |
| 2013/0152415 A1 | 6/2013 | Yi et al. |
| 2013/0333233 A1 | 12/2013 | Esposito |
| 2014/0008596 A1 | 1/2014 | Herman |
| 2015/0128507 A1 | 5/2015 | Knudsen |
| 2015/0197961 A1 | 7/2015 | Burenga |
| 2016/0097637 A1 * | 4/2016 | Corgat | E04H 17/263 33/373 |
| 2016/0333603 A1 | 11/2016 | Knudsen |
| 2017/0306644 A1 | 10/2017 | Hoffman |
| 2019/0177999 A1 * | 6/2019 | Hemingway | E04H 17/263 |

FOREIGN PATENT DOCUMENTS

| | | |
|---|---|---|
| KR | 10-0991886 B1 | 11/2010 |
| WO | 2007/064235 A1 | 6/2007 |
| WO | 2008/047151 A1 | 4/2008 |

OTHER PUBLICATIONS

Software Design Associates, "Computer Fencing System V8," URL=http://www.fencesoftware.com/v8, download date Jun. 19, 2012, 2 pages.

Software Design Associates, "The Computer Fencing System: Windows Version 7," URL=http://www.fencesoftware.com/pdf/forms/V7/V7CFSInfoPkg.pdf, download date Jun. 19, 2012, 25 pages.

* cited by examiner

Fence Genius

Length: 64.50"
Height: -0.1"
Tilt: -.01 degrees
Front angle: 335.3 degrees
Rear angle: 0.2 degrees
Latitude: 47.353580
Longitude: 122.010570
Time: 13:42:47.000 8/23/2015

Bluetooth: Connected; 269-330; N/A

[Accept]   [Cancel]

*FIG.16*

POST SLEEVE POSITIONING APPARATUS AND RELATED METHODS

BACKGROUND

Technical Field

The disclosed embodiments relate in general to systems for positioning ground inserts, or post sleeves, in the ground to receive posts, and in particular to systems for accurately and repeatably positioning post sleeves relative to the surrounding terrain and/or adjacent post sleeves.

Description of the Related Art

Fences are ubiquitous in modern society, used in a vast range of applications, to mark and accent boundaries, provide security, and control movement of people and animals. Thousands of miles of new and replacement fences are installed every year in the U.S., and utilize vast amounts of construction-related natural resources.

FIG. 1 shows a landscape with a fence 100 extending along portions thereof. The fence 100 shown in FIG. 1 comprises two major segments, or runs 102. A run is a section or portion of a fence that extends between natural dividing points such as corners, gates, buildings, etc. Except where a fence is attached to a building, each run 102 generally has a main post 104a at each end and line posts 104 spaced between the main posts. Each pair of adjacent posts 104 has a fence panel 106 coupled between them. Each panel 106 comprises horizontal elements, or rails 108, and vertical elements, or fence boards 110.

Typically, fence construction and installation involves a number of steps. In some cases, a site survey is done to determine the precise location of the fence and to prevent the all-too-common (and potentially very expensive) occurrence of installing a fence a few inches or feet beyond the actual property line. A contractor visits the site to estimate the materials and labor required to build and install the fence. In addition to simply measuring linear feet required, elements such as topography and obstructions must be reviewed and accounted for. If the fence location has not been marked by the owner or surveyor, the contractor may mark the location during the initial visit, or during a later visit. Installation is scheduled, and materials are ordered and delivered to the site.

Depending on the scope of the project, the locations and spacing of the fence posts may be determined and laid out in advance, by a landscape architect, for example, or left to the installation crew to determine on site. In either case, the spacing of the posts is limited by the material available, and typically is selected to make best use of that material. For example, 96 inch lumber is commonly used to frame wooden fences, so the maximum distance between posts cannot exceed 96 inches. On the other hand, if the contractor uses 96 inch lumber, it would be wasteful to set the posts 60 inches apart, which would result in about three feet of waste from every framing rail. However, because of other considerations, some waste is unavoidable. It is generally preferable to evenly space the posts of a given run of fence, to provide an attractive and unified appearance. Inasmuch as such a run will rarely be evenly divisible by eight feet, each post will be something less than eight feet apart. Additionally, if the terrain includes changes in elevation which the bottom and/or top rail must follow, the length of the angled framing rails between two posts that are at different heights may be much greater than the lateral distance between the posts, which reduces the maximum permissible horizontal distance between any of the posts of that run. Furthermore, it can be difficult, or at least time consuming, to precisely position a post to within a fraction of an inch, so a margin of an inch or two is generally provided. Thus, the posts may be spaced anywhere from a couple of inches to a couple of feet less than the maximum allowable distance. Finally, when building fences from natural materials such a wood, it is not uncommon for individual pieces to be unsuitable, because of, for example, a knot in a position that unacceptably weakens a part, or an excessively warped board, etc. For all of these reasons, some material waste is expected and allowed for in the original estimate when calculating the materials for the frame rails, and, for similar reasons, when calculating materials for fence boards and posts.

Once the materials and crew are at the site, and with post locations marked, the post holes are dug, and the posts are installed. Each post hole may be partially backfilled with gravel to improve drainage, and the post is then stood in the hole and held in place by several stakes driven into the ground around the post and braces of scrap lumber nailed to the stakes and the sides of the post. A concrete footing is poured into the hole around the post and allowed to set, and the stakes are later removed. With all the posts in place and the footings set sufficiently to remove the braces, frame rails are cut to fit, and attached to the posts, extending between adjacent posts along the bottom and top of the fence. Fence boards are then cut to length and attached to the frame rails. Perfectly parallel and consistently spaced fence boards along the entire fence run is important, because differences in spacing will become very obvious to an observer when there is daylight behind the fence. Because of variations in the spacing of the posts, it is often necessary to rip fence boards lengthwise to maintain the correct spacing in some of the panels of a fence run. Additionally, the lengths of the fence boards may vary considerably. For example, the ground line between posts can have obstructions or changes in elevation that the installer adjusts for in the length of the fence boards in order to maintain a straight line at the top of the fence while still maintaining proper spacing or ground clearance at the bottom. Additionally, many fences include decorative features along the top, such as arches or waves, in which case the builder may extend the fence boards above the desired finish line, and cut the fence boards to follow the desired shape, after installation. The posts are also cut down to the final length after installation, and post caps or finials are often attached to the tops. After the fence is installed, it is usually painted or stained to protect the wood and extend its useful life.

If properly executed using good quality material, a fence that is built and installed as described above can be very attractive, and can last for many years. However, it will be noted that there is a significant amount of waste that is produced. Not only does such waste result in higher material costs, it increases shipping costs because it must be transported to the site and later removed, it increases landfill use and fees, and wastes otherwise valuable resources.

In view of the expense, labor, and waste associated with installing a fence that is custom-built on site, another method of building and installing fences has been introduced. Pre-manufactured fence panels are becoming more available, and increasingly can be found in a wide variety of materials, including wood, vinyl, composite, aluminum, steel, concrete, etc., and in a wide variety of designs.

Pre-manufactured panels or kits are typically sold from retail lumber and hardware outlets. The panels and kits are provided in standard sizes and are ready for installation. One common panel size, of the many available, is six feet tall by eight feet long. The installer digs the post holes at intervals of eight feet plus the width of a fence post, and places the first post, with stakes and braces to hold it plumb while the concrete sets, as described above. However, the installer also attaches the first fence panel to the post, and may attach the second post to the first panel at the same time, installing both posts together. The installer then progresses post-by-post, attaching a panel between each pair of posts before pouring the footing around the second of the pair, bracing each post and shimming up each panel to ensure that the post is held plumb and the fence level until the post footings are sufficiently hardened, which may be several days because of the mass of the fence being supported. This process ensures that the spacing between the posts is correct for the eight-foot panels. At the end of a fence run, if the last post is less than eight feet from the previous one, the installer cuts a fence panel to fit in the remaining space. Alternatively, the installer may install all of the posts first, but this requires significant care to ensure that the distance between the posts is exactly correct. Otherwise, it may be necessary to trim the panel to fit, or shim the post to fill a gap.

In contrast to site built fencing, pre-manufactured fence panels can be produced efficiently, inexpensively, and at a consistent, predictable quality. Because they are produced in a manufacturing facility, waste can be significantly reduced, and the waste that is produced is more likely to be recycled either internally to produce other products or externally rather than sent to a landfill. Material handling methods and automated machines for material optimization allow utilization of all lengths of raw materials. The factory can obtain lumber that has not been cut to standard lengths, but is the full length of the log, or stem, from which it was milled. Scrap that won't work on one fence panel or design can be diverted and used for another. Flaws and defective lumber can be detected automatically, and can often be cut out, allowing the remaining material to be salvaged. This optimization and defective-material/scrap management process is much more environmentally friendly than site-built fence processes, especially as it relates to reducing the production, and increasing the productive recycling, of waste lumber. As tree trunks don't come in perfect length increments, the factory can bring in material in lengths determined by the actual tree trunks and optimize those random lengths via computer to best utilize the material, and minimize waste. The panels can be primed or finished in spray booths or dip tanks in large volumes, using better quality control, wasting less material, and reducing or eliminating the environmental impact that arises from on-site finishing.

Overall, fences built using pre-manufactured fence panels can be made more efficiently, less expensively, and to higher and more consistent quality standards, with less waste and less environmental impact, than fences custom-built on site.

Further, post sleeve positioning apparatuses and methods have been developed to facilitate the efficient positioning and construction of post sleeves, fence posts, and fences. Prior post sleeve installation devices have included a standing structure, a structure coupled to the standing structure and configured to support a post sleeve below the standing structure, and a mechanism configured to enable selective translation of the support structure in three axes and rotation around a vertical axis. Locks have been provided to lock the post sleeve at a selected position and orientation relative to the standing structure. A beam extending from one installation device to another has been used to measure or control the relative spacing, orientation, and elevation of associated post sleeves, and related data has been collected for off-site manufacture of fence panels. Additionally, a repository has been provided, to which the data is transmitted for retention, and from which the data can be retrieved for manufacture of replacement fence panels. Examples are described in U.S. Pat. No. 7,861,434, which is hereby incorporated herein by reference in its entirety.

BRIEF SUMMARY

The present disclosure describes post sleeve positioning apparatuses and methods having features and advantages not provided by prior systems. For example, the present disclosure describes post sleeve installation devices and spacing beams that can be coupled to one another to form a post sleeve positioning system in which the spacing beam can be oriented at any angle with respect to the post sleeve installation devices. Thus, in the post sleeve positioning systems described herein, the spacing beam need not be level during use, and rather can be oriented at any desired pitch or incline. The post sleeve positioning systems described herein can be more durable than prior systems and can make the process of positioning post sleeves, fence posts, and fences more efficient.

A system for positioning post sleeves may be summarized as including: a first post sleeve installation device configured to receive a first post sleeve and to enable selective adjustment of a position of the first post sleeve; a second post sleeve installation device configured to receive a second post sleeve and to enable selective adjustment of a position of the second post sleeve; and a spacing mechanism coupleable between the first and second post sleeve installation devices to determine or control an elevation of the first post sleeve relative to the second post sleeve, the spacing mechanism having a variable length and an adjustable pitch.

The spacing mechanism may include a spacing beam configured to be coupled at a first end to the first post sleeve installation device and at a second end to the second post sleeve installation device. The adjustable pitch of the spacing mechanism may enable the spacing mechanism to be oriented at a plurality of non-zero pitches. The spacing mechanism may include a main body having a first end and a second end opposite the first end, and the spacing mechanism may include a hinge and a joint at the first end of the main body. The hinge may have a horizontal pivot axis that is perpendicular to a longitudinal axis of the main body, and the joint may have a pivot axis that is perpendicular to the horizontal pivot axis of the hinge. The joint may include a first radial encoder to sense an angular rotation of the joint, and the hinge may include a second radial encoder to sense an angular rotation of the hinge. The main body may include telescoping portions and a main body sensor configured to sense a change in length of the main body.

The system for positioning post sleeves may further include a controller configured to receive signals from the first and second radial encoders and the main body sensor, and output data indicative of a position and an elevation of the first post sleeve installation device with respect to the second post sleeve installation device.

The spacing mechanism may include a main body having a first end and a second end opposite the first end, and the spacing mechanism may include a respective hinge and a respective joint at each of the first and second ends of the main body, each hinge having a horizontal pivot axis that is perpendicular to a longitudinal axis of the main body, and each joint having a pivot axis that is perpendicular to the horizontal pivot axis of the hinge. The first post sleeve installation device may include a vertical coupling shaft, and an end of the spacing mechanism may include an internal cavity configured to receive the vertical coupling shaft. The vertical coupling shaft may have a bottom end having a cross-sectional shape comprising a first square, and the internal cavity may have an opening having a cross-sectional shape comprising a second square corresponding to the first square. The first post sleeve installation device may include a plurality of vertical coupling shafts, and the end of the spacing mechanism may be selectively coupleable to one of the plurality of vertical coupling shafts.

A method may be summarized as including: installing a first fence post sleeve using an installation device; adjusting an elevation of a second fence post sleeve relative to the first fence post sleeve using the installation device, the installation device including a spacing mechanism oriented at a non-zero pitch; and fixing the elevation of the second fence post sleeve relative to the first fence post sleeve.

Adjusting the elevation of the second fence post sleeve may include determining, using a controller, the elevation of the second fence post sleeve relative to the first fence post sleeve based on a signal, received by the controller, corresponding to the non-zero pitch.

The method may further include communicating a signal corresponding to the elevation of the second fence post sleeve relative to the first fence post sleeve to a remote database.

A method may be summarized as including: installing a first fence post sleeve; installing a second fence post sleeve; and determining an elevation of the second fence post sleeve relative to the first fence post sleeve with a installation device including a spacing mechanism oriented at a non-zero pitch.

Determining the elevation of the second fence post sleeve relative to the first fence post sleeve may include adjusting the pitch of the spacing mechanism.

The method may further include communicating a signal corresponding to the elevation of the second fence post sleeve relative to the first fence post sleeve to a remote database.

BRIEF DESCRIPTION OF THE SEVERAL VIEWS OF THE DRAWINGS

FIG. 16 shows a user interface for use with the systems described herein, according to at least one illustrated embodiment.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with the technology have not been shown or described in detail to avoid unnecessarily obscuring descriptions of the embodiments.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the context clearly dictates otherwise. It should also be noted that the term "or" is generally employed in its broadest sense, that is, as meaning "and/or" unless the context clearly dictates otherwise.

As noted above, pre-manufactured fence panels provide a number of benefits over conventional site-built fences. Nevertheless, they are not widely used, especially by commercial fence builders. A fundamental problem that prevents wider adoption of pre-manufactured fence panels is that they are not manufactured for specific locations, but are made to standard sizes, so the user does not have the option of using non-standard post spacing. Because the spacing must conform to a standard, a shorter, custom length panel is almost always required at one of the ends of a run, which can result in an unbalanced appearance and detract from the appearance of the finished fence. Further, the process of making the custom length panel on site can add to the waste factor.

Figure 1:
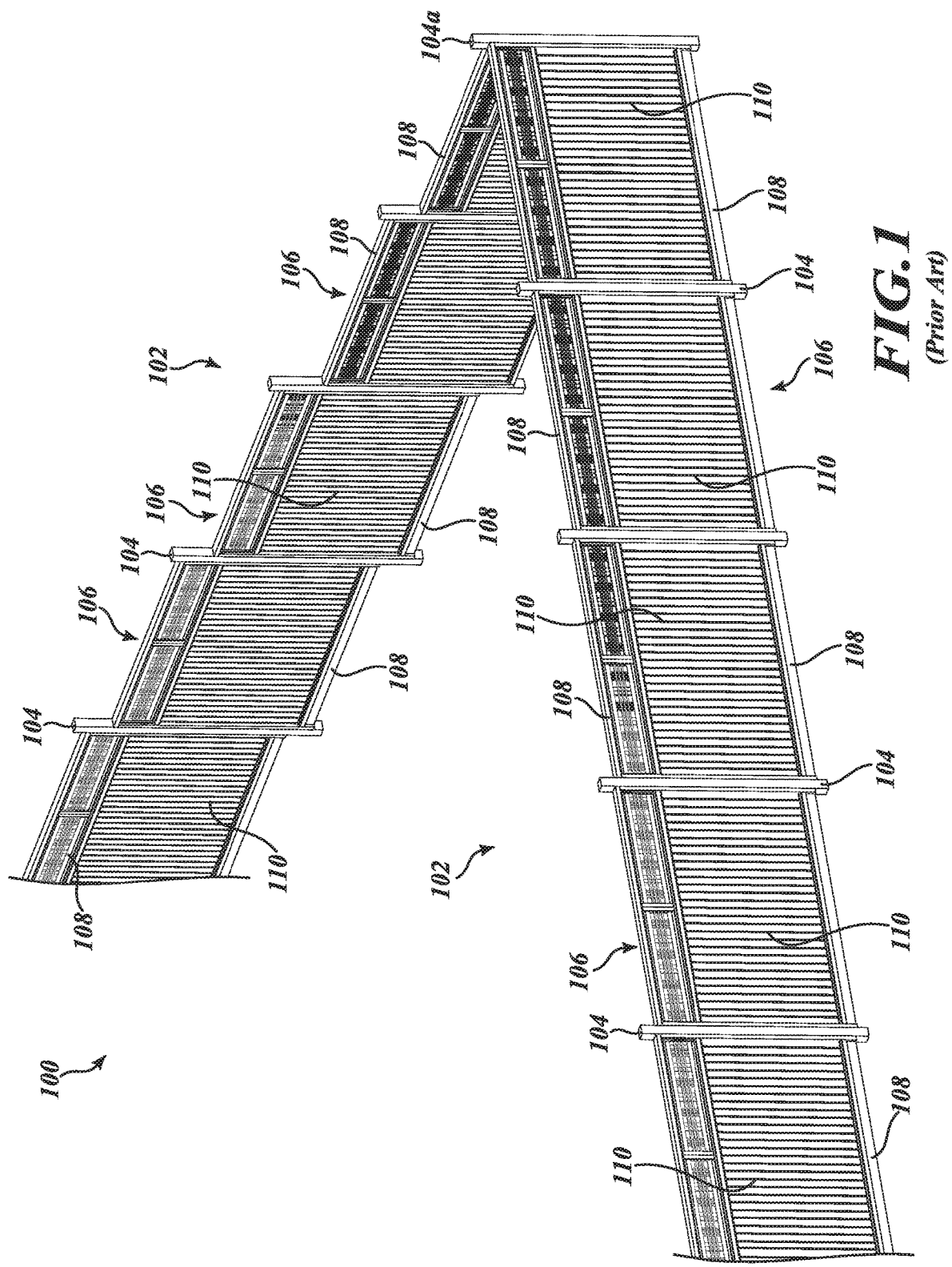
FIG. 1 shows a landscape with a fence.

Additionally, a typical pre-manufactured fence panel can only be installed to extend perpendicular to a vertical post, so it cannot follow a change in elevation. The installer is obliged to stair-step the panels, as illustrated in the run 102 of FIG. 1, rather than "racking" the rectangular shape to become a parallelogram roughly following the topography. Furthermore, stair stepping generally results in a gap under the fence at the low side of each panel, which may require that some extension be added to the bottoms of the panels to fill the gaps. These options may not be acceptable to the end user, especially when the end user is paying the higher cost that a typical site-built fence commands. Finally, commercial installers generally find it more efficient to install all of the posts first, and then install the structural stringers and fence boards. Because of the difficulty in spacing and elevating the posts with sufficient accuracy for pre-manufactured panels, and the resulting extra expense entailed in more careful spacing, or reworking a panel when the spacing is not correct, commercial fence contractors often avoid pre-manufactured fence panels.

With a more reliable and efficient mechanism for accurately positioning fence posts during installation, pre-manufactured fence panels would be more widely acceptable. Additionally, if custom fence panels could be built in a factory setting, they would benefit from many of the same advantages that are associated with the pre-manufactured commodity panels, which are typically available only in standard styles and sizes. Thus, as noted above, some existing post sleeve positioning apparatuses and methods have been developed to facilitate the efficient positioning and construction of post sleeves, fence posts, and fences.

For example, systems are known for selectively positioning post sleeves in the ground, each sleeve being configured to receive a respective fence post, such as the systems disclosed in U.S. Pat. No. 7,861,434, which is hereby incorporated herein by reference in its entirety. In addition, post sleeves are disclosed, for example, in U.S. Pat. No. 8,011,149, and entitled "Post Sleeve Assembly," which is also incorporated herein by reference in its entirety. Post sleeves are devices that are configured to be permanently fixed in the ground at the location of a fence or sign post, and into which the post is later positioned. Once a post sleeve is set in the ground, the precise position and depth of the post is fixed, and therefore the relative positions and orientations of adjacent posts are also fixed, by respective post sleeves, before the posts are emplaced. Accordingly, the dimensions of a fence panel that is to be installed between two adjacent posts can be determined, from the relative positions and orientation of the post sleeves, to a degree sufficient to manufacture the panel offsite, with confidence that the panel will properly fit between the posts that are eventually placed in the sleeves. Finally, if the position and orientation of the post sleeves of a fence can be adequately controlled during installation, the dimensions of each of the fence panels can be planned in advance, so that the posts and fence panels can be ready for installation when the post sleeves are installed.

Figure 2:
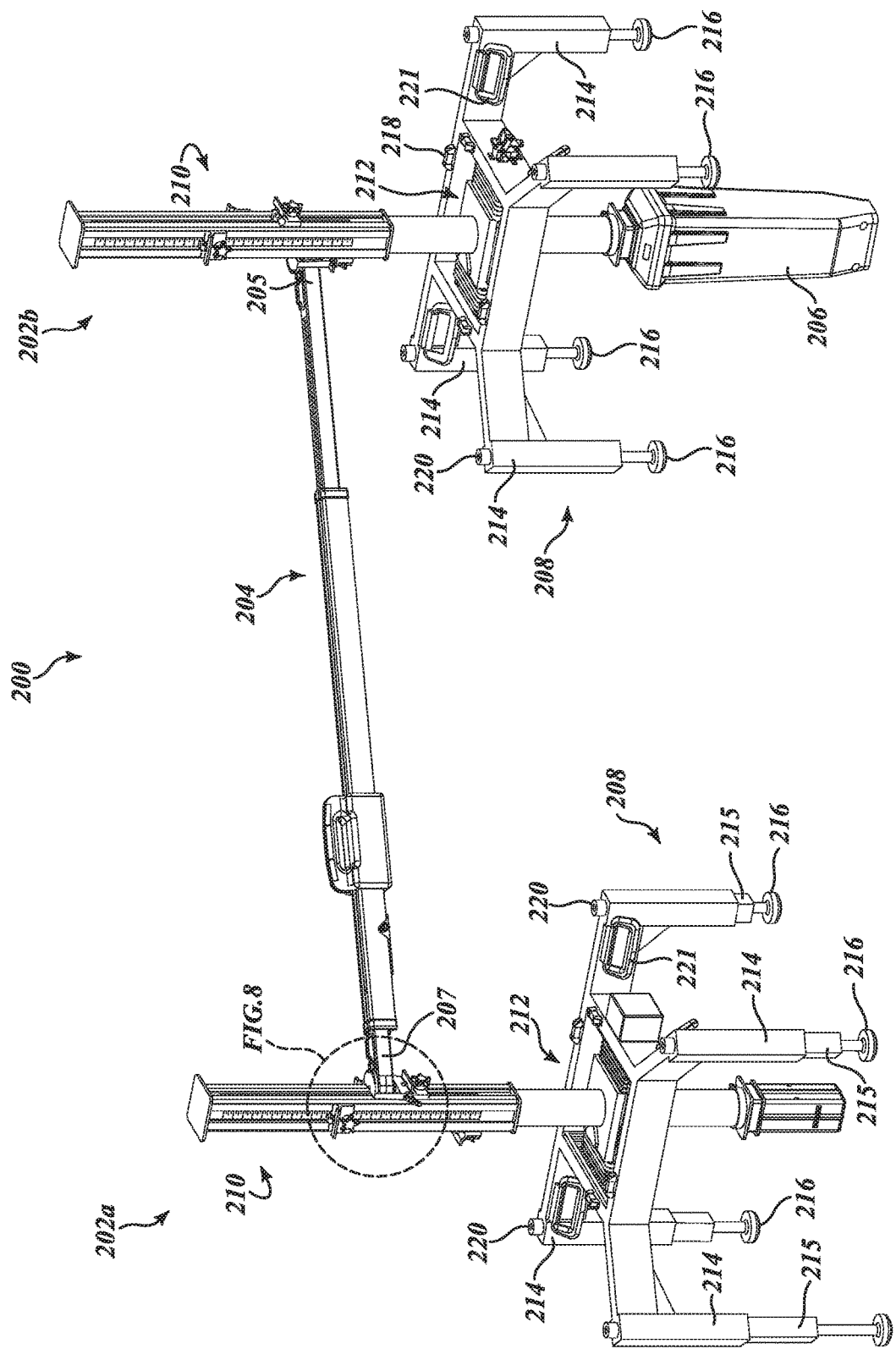
FIG. 2 shows a known post sleeve positioning system including a pair of post sleeve installation devices and a level spacing beam.

By way of additional background, FIG. 2 shows a known post sleeve positioning system 200. The system 200 includes a plurality of post installation devices, or "spider frames" 202a, 202b, and a spacing beam 204 having first and second ends 205, 207. Hereafter, except where it is necessary to distinguish between spider frames 202a and 202b of FIG. 2, they will be referred to simply by reference number 202.

Each spider frame 202 is configured to suspend a post sleeve 206 in a post hole in a position that is minutely adjustable in three axes and around a longitudinal axis. The spacing beam 204, when coupled to extend between two spider frames 202 supporting respective post sleeves, is configured to determine or control the relative positions and orientations of the post sleeves 206.

Using at least two spider frames 202 and a spacing beam 204, a user can install post sleeves in preselected positions, relative to each other, well within acceptable tolerances for offsite production of custom pre-manufactured fence panels and cut-to-length posts, for future installation by others. By leapfrogging two or more spider frames 202, as will be described later in more detail, a user can similarly install any number of post sleeves.

Each spider frame 202 comprises a leg assembly 208, a column assembly 210, and a position assembly 212. The leg assembly 208 supports the spider frame 202 and includes a plurality of legs 214 with adjustable feet 216 by which the spider frame 202 can be positioned level over a post hole, regardless of the terrain. As shown on the spider frame 202a, the legs 214 each include an inner telescoping sleeve 215 to accommodate extreme slopes. Spirit vials 218 are attached to an upper surface of the leg assembly 208 to facilitate leveling. Adjustment knobs 220 at the top of each leg 214 are coupled to an extension mechanism of the respective leg. Using a standard cordless drill with a driver insert, the user can engage a socket provided in each knob 220 to adjust the length of the respective leg 214. Rotation of the knob 220 in one direction, e.g., clockwise, extends the respective foot 216 and lengthens the leg, while rotation of the knob in the opposite direction retracts the foot 216 and shortens the leg. The knobs can also be manually rotated. In alternative implementations, motors or actuators are provided in the spider frame to control the leg lengths. Handles 221, shown on spider frame 202, are provided to simplify moving and lifting of the spider frame. At least two of the legs 214 can be provided with lockable wheels to permit a single installer to move the spider frame "wheelbarrow" style.

Figure 3:
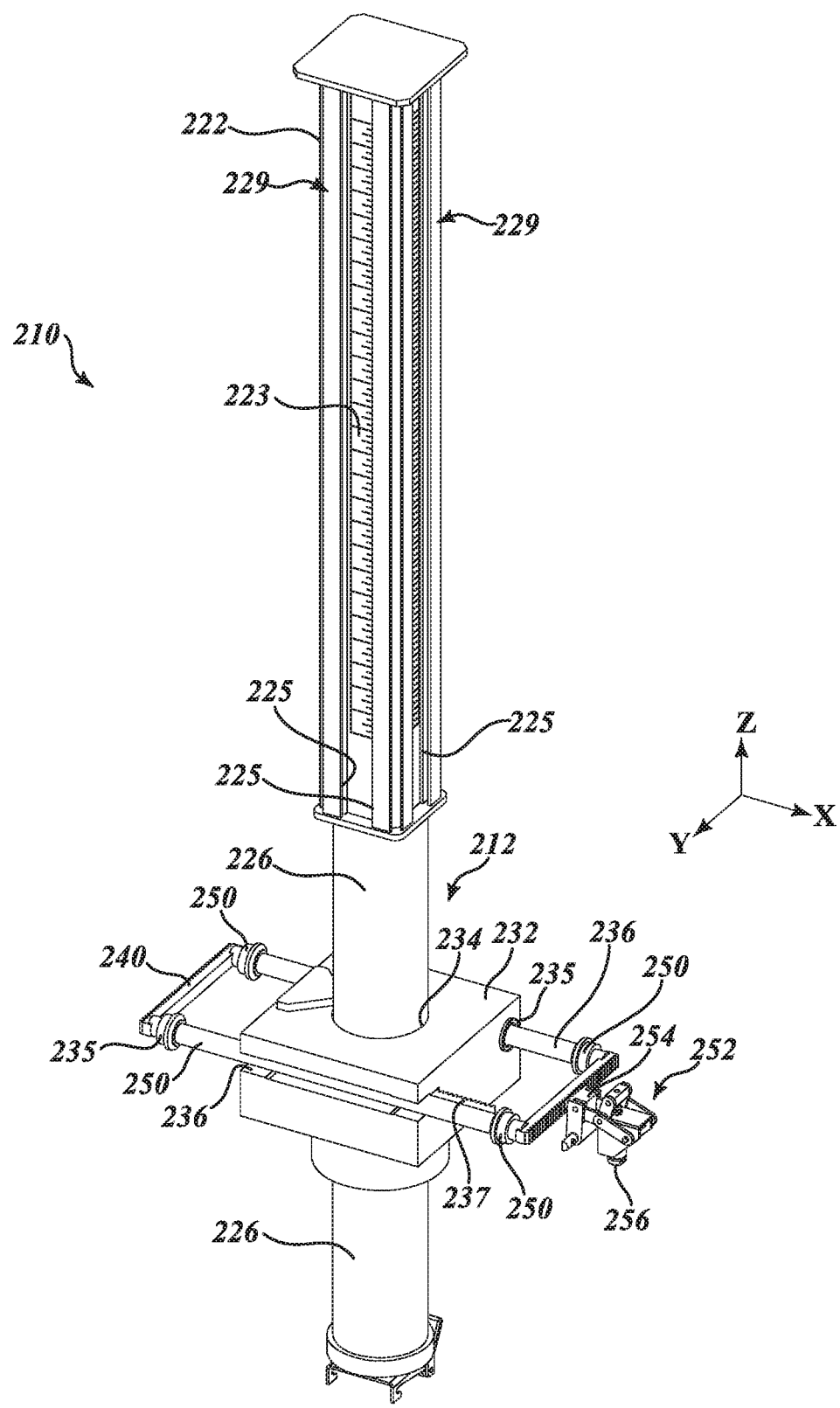
FIG. 3 shows a perspective view of elements of one of the post sleeve installation devices of FIG. 2, showing position control and lock mechanisms for x, y, and z axes and orientation.

Turning to FIG. 3, the column assembly 210 and portions of the position assembly 212 are shown. The position assembly 212 includes a column assembly bearing block 232 with a cylindrical aperture 234 extending therethrough parallel to the Z axis and two guide channels 235 extending parallel to the X axis. A pair of guide shafts 236 are positioned in respective ones of the guide channels 235 with a pair of Y axis racks 240 extending between the guide shafts at respective ends. The column assembly 210 is supported by the bearing block 232, which in turn is coupled to the leg assembly 208 via the guide shafts 236. The ends of guide shafts 236 engage respective Y-axis bushings 250 that are positioned in slots formed in the leg assembly 208, permitting the guide shafts 236, with the bearing block 232 and column assembly 210, to translate in the Y axis. A Y-axis lock 252 is coupled to the leg assembly 208 and includes a rack engagement block 254 configured to engage the teeth of one of the Y-axis racks 240, in order to lock the guide shafts 236 in the Y axis. A pneumatic piston 256 is configured to disengage the Y-axis lock 252 when activated. The position assembly 212 also includes mechanism for locking the position of the column assembly in the X and Z axes and orientation. These mechanisms are shown and described in more detail later.

Figure 5:
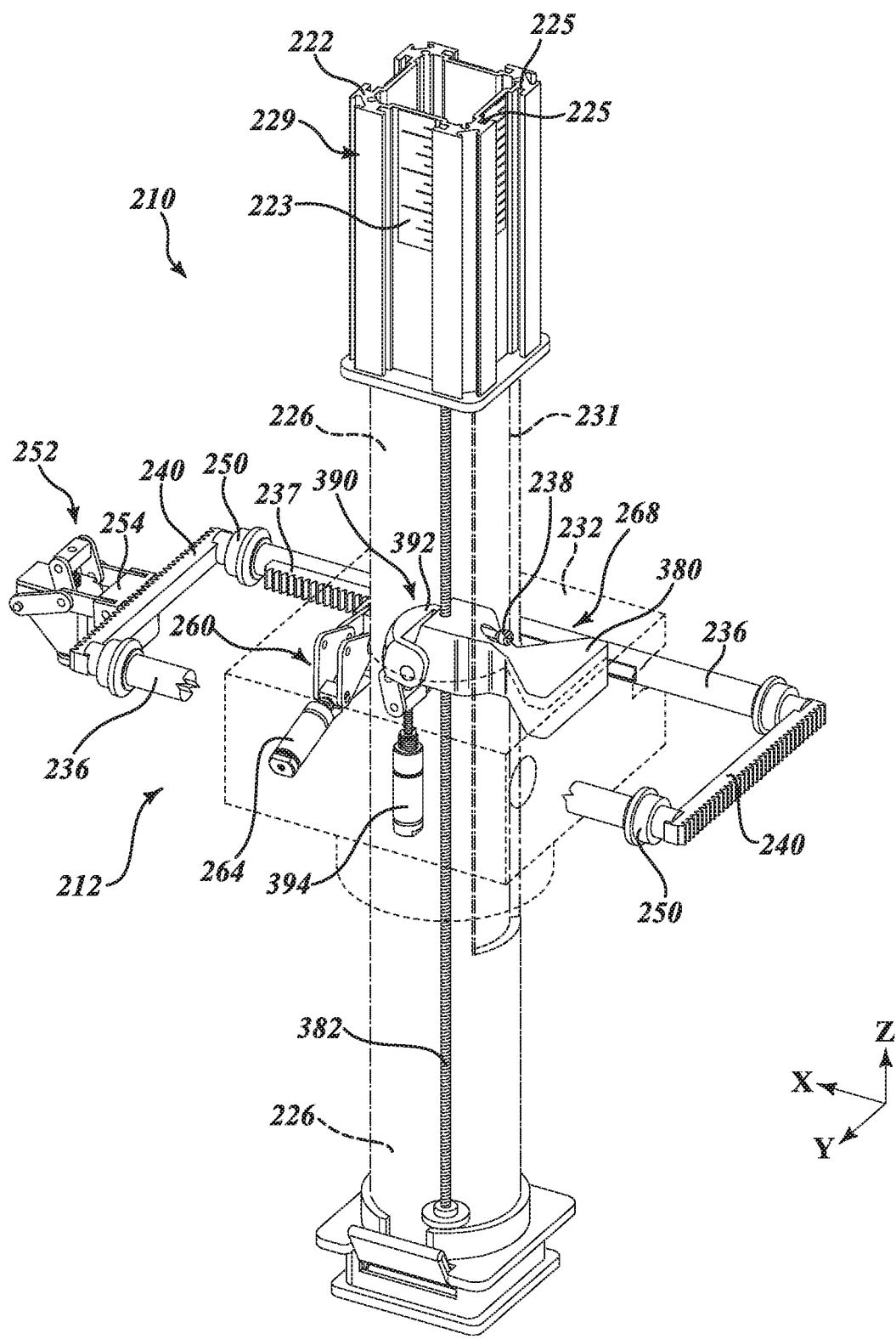
FIG. 5 shows a perspective view of z-axis and orientation control and lock mechanisms of another known post sleeve installation device.
Figure 6:
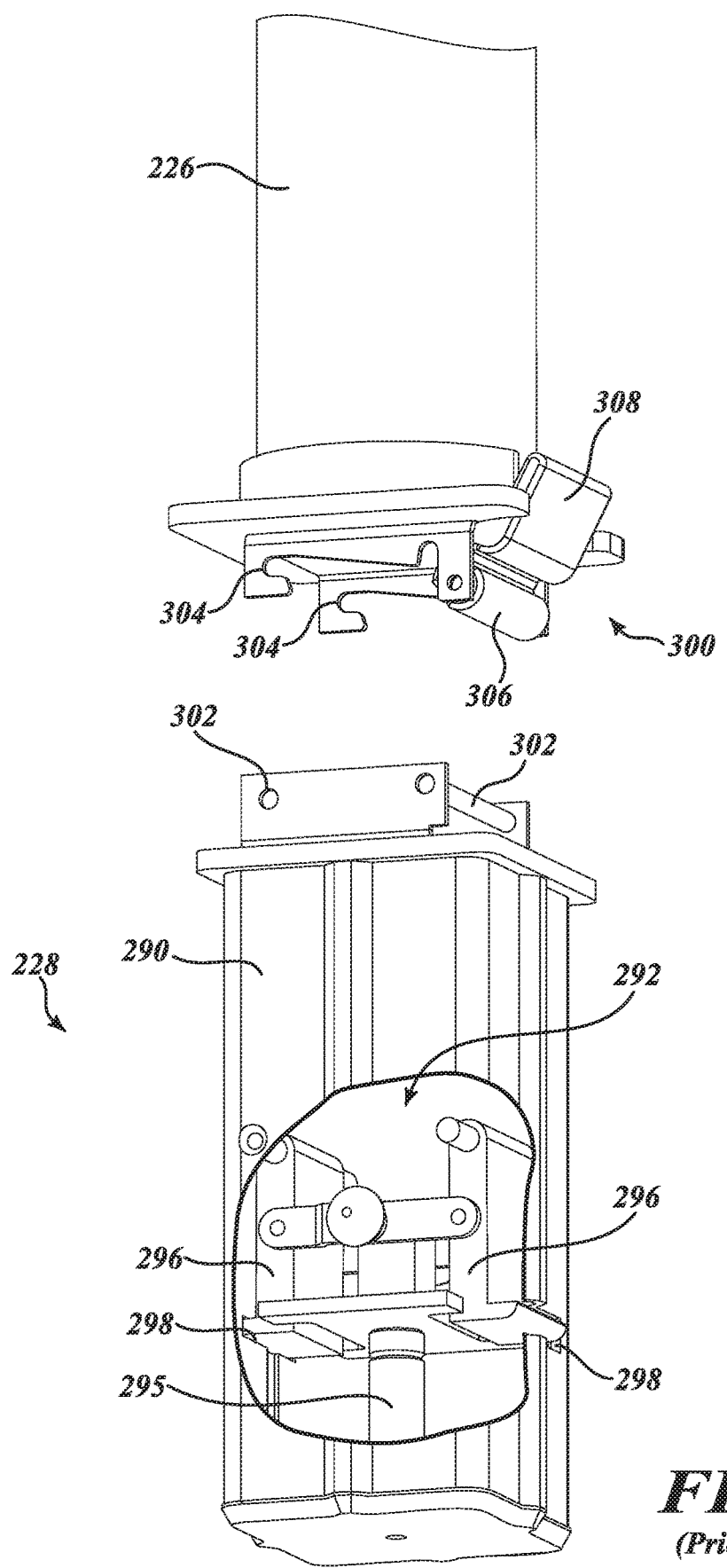
FIG. 6 shows a post sleeve attachment mechanism and quick release mechanism of the post sleeve installation device of FIG. 3.

The column assembly 210 comprises a Z-axis index 222, a Z-axis spacer 226, and a post sleeve support assembly 228 (see FIG. 6). The Z-axis index 222 has four vertical faces 229, each of which is provided with a pair of longitudinal slots 225 and an elevation scale 223 between the slots. Adjustable support saddles 227 slidably engage the longitudinal slots 225, and are configured to receive an end of the spacing beam 204, which will be described later. The Z-axis index 222 is rigidly coupled to one end of the Z-axis spacer 226, while the post sleeve support assembly 228 is rigidly coupled to the other end of the Z-axis spacer. Thus, the distance and orientation of the post sleeve support assembly 228 remains fixed with respect to the Z-axis index 222. The Z-axis spacer 226 extends through the aperture 234 of the column assembly bearing block 232 so that a portion of the column assembly is above the bearing block and a portion is below. The Z-axis spacer 226 is translatable in the Z axis and rotatable around a longitudinal axis that lies parallel to the Z axis, within the aperture 234 of the column assembly bearing block 232. A Z-axis control 268 is provided (see FIG. 5) that locks the column assembly 210 in the Z-axis and in orientation, relative to the bearing block 232.

Figure 4:
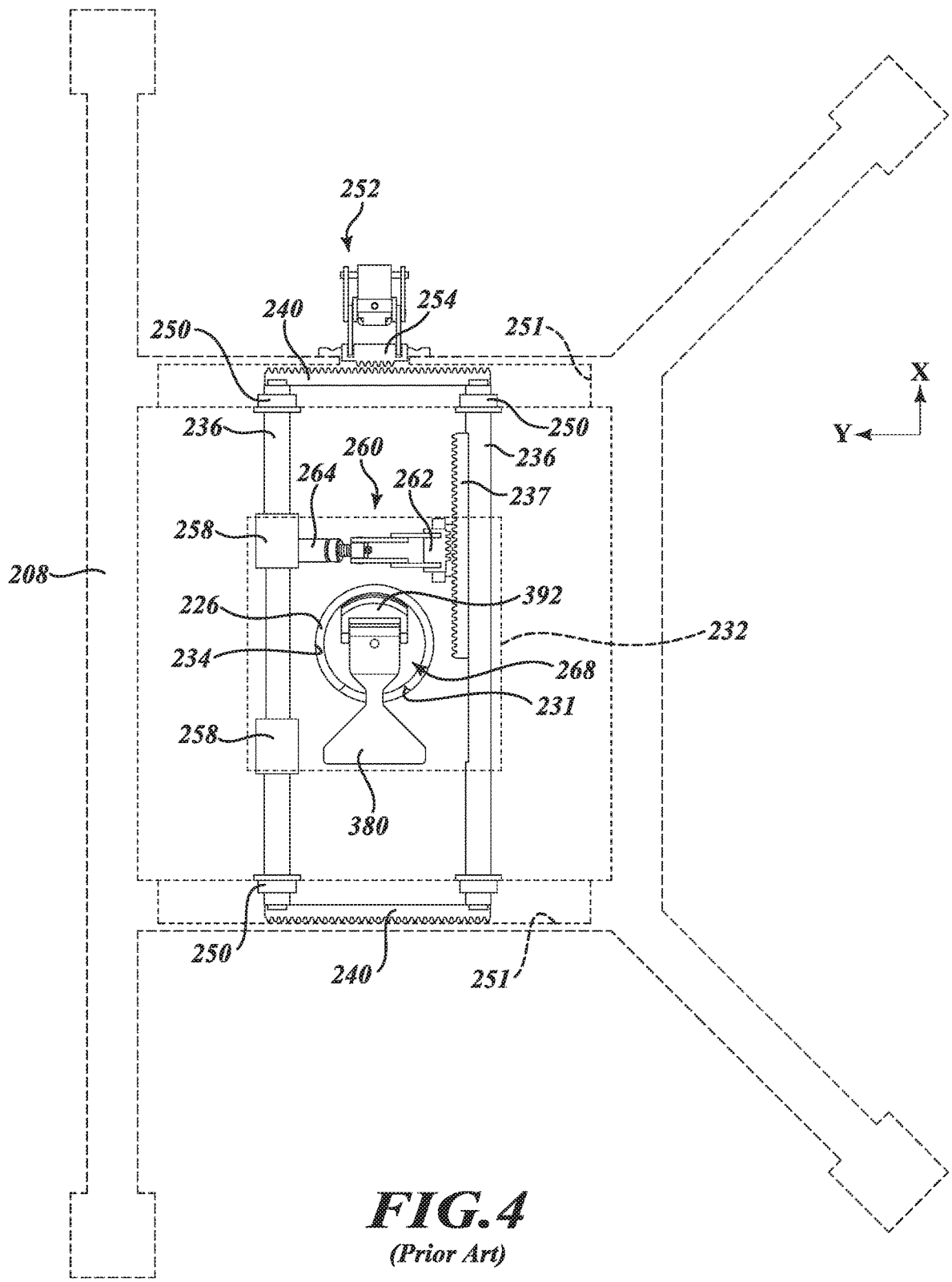
FIG. 4 shows a plan view of elements of the post sleeve installation device of FIG. 3, showing additional details of the position control and lock mechanisms.

Turning to FIGS. 4 and 5, elements of the position assembly are described in more detail. FIG. 4 shows the position assembly 212 in plan view, with outlines of the leg assembly 208 and the column assembly bearing block 232 provided in dashed lines to show relative positions. Also shown are the locations of slots 251 in which the Y-axis bushings 250 are positioned to permit translation of the bearing block 232 and column assembly 210 in the Y axis. The Z-axis spacer 226 is positioned in the cylindrical aperture 234, and includes a longitudinal aperture 231 through which a portion of the Z-axis control 268 extends.

The bearing block 232, with the column assembly 210, slides along the guide shafts 236 in the X axis. X-axis bushings 258 are provided in the guide apertures 235 to facilitate movement of the bearing block 232 along the guide shafts 236 without undue play. An X axis rack 237 is coupled to one of the guide shafts. An X-axis lock 260 is coupled to the bearing block 232 and comprises a rack engagement block 262 configured to engage the teeth of the X-axis rack 237, in order to lock the bearing block 232 in the Y axis. A pneumatic piston 264 is configured to disengage the X-axis lock 260 when activated.

FIG. 5 shows, in perspective view, the position assembly 212 and portions of the column assembly 210. The bearing block 232 and the Z-axis spacer 226 are shown in dashed lines for reference. The Z-axis control 268 includes a Z-axis lift bracket 380, a lead screw 382, and a Z-axis drive. The Z-axis lift bracket 380 is coupled to the bearing block 232 and cantilevers into the longitudinal aperture 231 of the Z-axis spacer 226, which extends for a substantial portion of the length of the spacer. The shape of the Z-axis lift bracket 380 and the width of the longitudinal aperture 231 cooperate to permit rotational adjustment of the column assembly 210 across a significant range. For example, the column assembly 210 can be rotated about 20-25 degrees in either direction from center. Provided the installer is able to orient the spider frame 202 to within about 20 degrees of the correct orientation, the column assembly 210 can be precisely adjusted to the desired orientation. The lead screw 382 is coupled to a plate at the bottom of the Z-axis spacer 226 and extends axially within the spacer and through an aperture in the Z-axis lift bracket 380. The Z-axis drive is mounted to the Z-axis lift bracket 380 and engages the lead screw 382. Although not shown in detail, the Z-axis drive operates in a manner similar to the worm drive 330 described with reference to FIG. 7. A drive input shaft is provided for operation of the Z-axis drive, which, moves the column assembly in the Z axis, relative to the bearing block 232. The drive input shaft is provided with a socket that is configured to receive a drive key, and can be operated using a common cordless drill.

An orientation lock 390 is coupled to the Z-axis lift bracket 380 inside the Z-axis spacer 226, and includes a brake shoe 392, pivotably coupled to the lift bracket, and a pneumatic actuator 394 that is rigidly coupled to the lift bracket via an actuator mount that is not shown. A spring pulls the brake shoe 392 down into engagement with the inner surface of the Z-axis spacer 226, effectively locking rotation of the column assembly 210. When the actuator 394 is activated, it pushes upward on the brake shoe 392 to disengage it from the spacer and permit rotational and Z-axis adjustment of the column assembly 210.

FIG. 6 shows the lower end of the Z-axis spacer 226 and the post sleeve support assembly 228. The post sleeve support assembly 228 includes an exterior casing 290, shown partially cut away to show details of a sleeve lift lock 292. The support assembly is also shown separated from the lower end of the Z-axis spacer 226 to better illustrate a quick release mechanism 300, by which the support assembly can be easily coupled and decoupled with the Z-axis spacer 226 allowing attachment of other devices such as bolt pattern plates or removable post hole molds. The lift lock 292 includes a pair of lift latches 296 configured to engage respective notches on inner surfaces of a post sleeve via slots 298 in the casing 290, in order to couple the sleeve to the post sleeve support assembly 228. A pneumatic cylinder 295 is configured to withdraw the latches into the casing to release the post sleeve. A manual release is also provided, comprising a section of braided wire coupled to the lift lock and extending to a pull-ring outside the upper end of the post sleeve support assembly 228.

The quick release mechanism 300 is provided to couple the post sleeve support assembly 228 to the Z-axis spacer 226. The quick release mechanism 300 includes a pair of support bars 302 coupled to the upper portion of the post sleeve support assembly 228, and engagement notches 304, a spring latch 306, and a release handle 308 coupled to the lower end of the Z-axis spacer 226. To couple the post sleeve support assembly 228 to the Z-axis spacer 226, the user first positions one of the support bars 302 in the engagement notches 304, then applies upward force to the post sleeve support assembly until the spring latch 306 engages the other of the support bars 302. To release the post sleeve support assembly 228, the user presses the release handle 308, which disengages the spring latch 306 from its support bar 302, permitting the other support bar to disengage from the engagement notches 304.

For operation of the various pneumatic devices described above, the spider frame 202 can be provided with an onboard source of pressurized air, as described later in an alternate design, or can include a pneumatic connector configured to receive pressurized air from an external source, such as from a compressor, storage tank, etc.

In operation, a user first attaches a post sleeve to the spider frame 202. This can be done by engaging the post sleeve support assembly 228 in a post sleeve, then coupling the quick-release mechanism 300, with the spider frame standing on buckets or saw horses, or otherwise somewhat elevated to provide sufficient clearance. The user, preferably with a helper, then positions the spider frame 202 over a previously prepared post hole. The user adjusts the legs 214 until the spider frame 202 is level and stable, referring to the spirit vials 218 to find the level position. The user then releases the Y-axis lock 252 by applying air pressure to the pneumatic piston 256, and moves the column assembly 210 in the Y axis until it is correctly positioned, then releases the air pressure from the piston 256, which locks movement in the Y axis. The user then releases the X-axis lock 260 by applying air pressure to the pneumatic piston 264, and moves the column assembly 210 in the X axis until it is correctly positioned, then releases the air pressure from the piston 264, which locks movement in the X axis. Alternatively, the user can release both X- and Y-axis locks simultaneously and move the column assembly freely in both axes, then, when the assembly is properly position, engage both locks again.

Having positioned the post sleeve in the X and Y axes, the user then activates the pneumatic actuator 394 to free the rotation lock 390 and the Z-axis control 268. Operation of the Z-axis drive moves the column assembly, with the post sleeve attached, in the Z-axis, and orientation can be simultaneously adjusted. When the actuator 394 is released, the brake shoe 392 again engages the Z-axis spacer 226, rotationally locking the column assembly.

With the post sleeve correctly positioned, the user backfills the post hole with concrete or other hardenable material around the post sleeve. When the concrete or other hardenable material has set sufficiently to hold the post sleeve in position, the user releases the lift lock 292 to separate the post sleeve support assembly 228 from the sleeve, and raises the column assembly 210 until the post sleeve support assembly 228 is out of the sleeve. The user can then move the spider frame from its position over the post hole, and repeat the installation steps to install additional sleeves.

In some instances, the sleeve can be placed in the hole first, then the spider frame placed over the hole and the sleeve engaged while in the hole. In the event there is no "partner" to assist, this is a desired method, due to the weight concerns.

While various mechanisms have been disclosed as being actuated by pneumatic pistons that are configured to disengage their respective locking mechanisms or provide z axis control, other control and locking systems can be used. Examples include manually operated locks, such that the user engages and disengages the locks by rotating respective levers or latches, locks operated by automatically or manually entering a desired position into a control circuit, sensors provided at various locations to detect the position and orientation of the column assembly, or servomotors controlled to reposition the column assembly to the desired position and orientation. The spider frame can also be self-leveling. Sensors such as are well known in the art detect the degree of correction required to level the frame, and activate servomotors, pistons, or the like, to extend or retract the feet as necessary.

Figure 7:
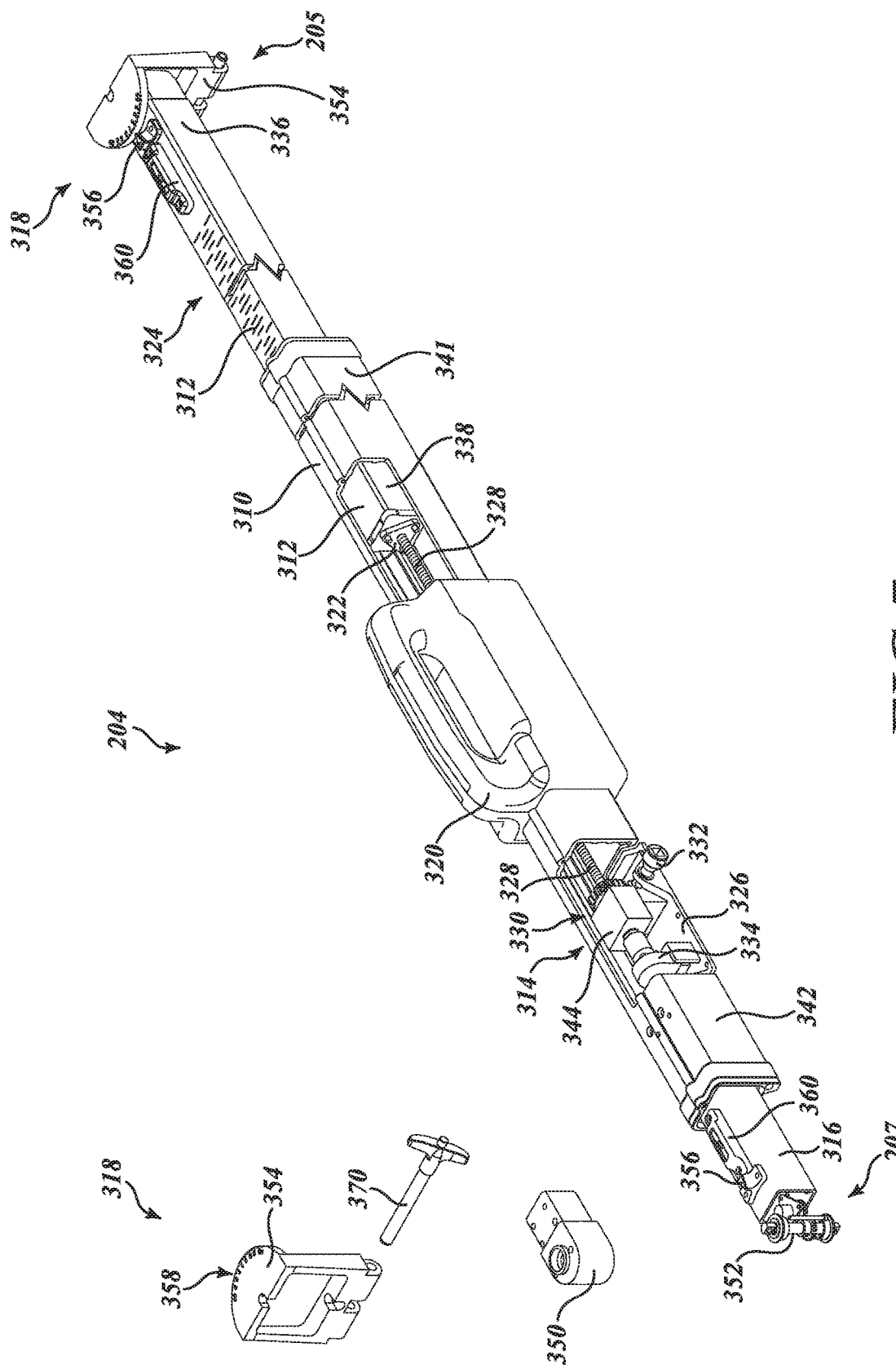
FIG. 7 shows the spacing beam of the post sleeve positioning system of FIG. 2.

Turning to FIG. 7, the spacing beam 204 is shown with portions cut away to show internal detail. The spacing beam 204 includes a hollow casing 310, an extension arm 312, an extension mechanism, 314, a fixed arm 316, and first and second mounting fixtures 318. The hollow casing 310, the extension arm 312, and the fixed arm 316 are formed from materials that are selected to be substantially rigid and lightweight, such as, for example, aluminum extrusion, fiberglass, carbon fiber, structural foam, etc. The hollow casing 310 includes a handle section 320 that incorporates electronic control circuitry, the operation of which will be described later. The extension arm 312 is configured to slide telescopically within the hollow casing 310. The first mounting fixture 318 is coupled to a first end 336 of the extension arm 312, which also corresponds to the first end 205 of the spacing beam. A drive nut 322 is coupled to a second end 338 of the extension arm 312, inside the casing 310. Scale markings 324 along the top of the extension arm 312 indicate, at the point where the extension arm enters a first end 341 of the hollow casing 310, a total length of the spacing beam 204.

The extension mechanism 314 includes a mounting plate 326, a worm drive 330, and a threaded drive rod 328 coupled to the mounting plate via a bearing block 344, and having a worm gear of the worm drive fixed thereto. A drive input shaft 332 is coupled to a worm of the worm drive 330, which engages the worm gear for rotation of the drive rod 328. An encoder 334 is mounted on the mounting plate and coupled to an end of the drive rod 332 to detect and meter rotation of the drive rod relative to the casing 310. The mounting plate 326 is rigidly coupled to the casing 310, with the drive rod extending longitudinally within the casing and the drive input 332 extending from the casing via an aperture. The drive rod 328 engages the drive nut 322 of the extension arm 312 inside the casing 310 such that rotation of the drive rod extends or retracts the extension arm, according to the direction of rotation. The drive input shaft 332 is provided with a socket that is configured to receive a drive key, and can be operated using a common cordless drill. In other instances, a servo motor is provided, configured to rotate the threaded drive rod 328, the drive nut 322, or the drive input 332 to extend and retract the extension arm 312.

The fixed arm 316 is rigidly coupled to the hollow casing 310 and extends a short distance from a second end 342 of the casing. The second mounting fixture 318 is coupled to the portion of the fixed arm 316 that extends from the casing 310, at the second end of the spacing beam 204.

The first and second mounting fixtures 318 may be substantially identical, and one is shown partially exploded in FIG. 7. Each mounting fixture 318 includes a hinge knuckle 350 that is rigidly coupled to one of the fixed or extension arms 316, 312. The hinge knuckle 350 is rotatably coupled to a mounting bracket 354 by a coupling pin 352. An encoder is mounted in the hinge knuckle 350 and coupled to the coupling pin 352 to detect and meter rotation of the hinge knuckle 350 relative to the mounting bracket 354. The mounting brackets 354 also include a scale 358 indicating degrees of rotation, and an indexing pointer 356 is provided on the end of the respective arm 316, 312, positioned to indicate on the scale 358 the angle of the spacing beam 204 relative to the mounting bracket 354. Spirit vials 360 are provided on the fixed and extension arms 316, 312 and configured to be centered when the spacing beam 204 is in a level position. The mounting brackets 354 are configured to be coupled to an index face 229 of the column assembly 210 of the respective spider frame 202, as described in detail with reference to FIG. 8.

In some instances, a metering circuit may be provided in the handle section 320, and coupled to the encoder 334 of the extension mechanism 314 and the encoders of the first and second mounting fixtures 318. The metering circuit is configured to determine, from the signal provided by the encoder 334 the position of the extension arm 312 relative to the casing 310, and thus the overall length of the spacing beam 204. From signals provided by the encoders, the metering circuit determines the angle of each of the mounting brackets 318 relative to a longitudinal axis of the spacing beam 204. The electronic system can also include an electronic level with a digital readout indicating the angle of the beam, and can provide an audible signal when the beam is level, which relieves the installer of the necessity to refer to a spirit vial while adjusting the beam.

When the spacing beam 204 is level and coupled to extend between two spider frames 202, as shown in FIG. 2, the precise distance between the two spider frames is equal to the length of the beam, which is indicated by the scale markings 324 on the extension arm 312, the relative orientations of the column assemblies 210 of the respective spider frames is reflected by the angles of the mounting brackets 354 relative to the axis of the beam, and the difference in elevation is obtained by reference to the elevation scales 223 on the index faces 229 to which the respective mounting brackets 354 are coupled, as discussed below.

Figure 8:
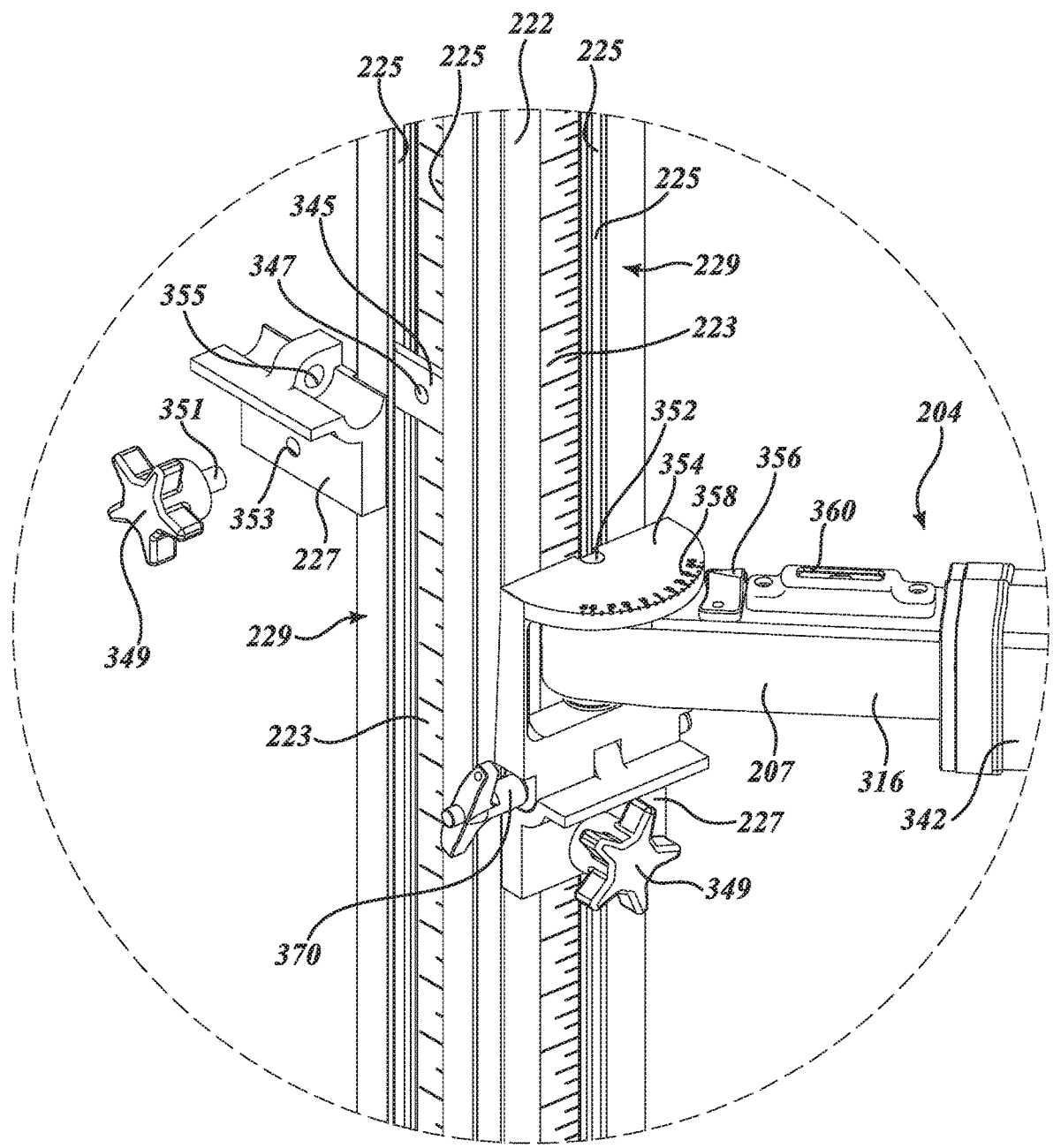
FIG. 8 shows a detailed view of a coupling mechanism of the spacing beam of FIG. 2.

Turning to FIG. 8, a detail of FIG. 2 is shown, indicated in FIG. 2 by dashed circle 9. FIG. 8 shows the second end 207 of the spacing beam 204, including the fixed arm 316 and the second mounting fixture 318, with the mounting bracket 354 coupled to a saddle 227, which in turn is slidably engaged to the longitudinal slots 225 of one of the faces 229 of the Z-axis index 222. A second saddle 227 is shown in exploded view, coupled to an adjacent face 229. The saddle 227 includes a locking plate 345 that is captured between facing pairs of the longitudinal slots 225 so as to be slidable along the face of the Z-axis index 222, but not removable. The locking plate 345 has a threaded aperture 347 that is engaged by a tensioning knob 349. The tensioning knob 349 includes a threaded connector 351 that traverses an aperture 353 in the saddle 227 and engages the threaded aperture 347 in the locking plate 345. While the tensioning knob 349 is loose, the locking plate 345 can slide along the longitudinal slots 225, but when the user tightens the tensioning knob 349, the saddle 227 and locking plate 345 cooperate to lock the saddle in position.

A locking pin 370 of the mounting bracket 354 engages a transverse aperture 355 in the saddle 227 and corresponding apertures in the mounting bracket 354 to form a hinged coupling between the mounting bracket and the saddle, which permits one end of the spacing beam 204 to be coupled to a spider frame 202 as the user raises the other end until the spacing beam is level. The elevation of the mounting bracket 354 on the Z-axis index 222 can be read from the scale 223 adjacent to the top surface of the mounting bracket.

It will be recognized that the value indicated on scale 223 has no relation to the elevation of the mounting bracket relative to the bearing block 232 or the leg assembly 208, or even, directly, to the ground on which the spider frame 202 is positioned. Instead, the value is directly related to the distance of the mounting bracket from the post sleeve coupled to the column assembly 210. Thus, the difference in values indicated at the first and second mounting brackets 354 of the spacing beam 204, coupled to respective spider frames 202, represents the difference in elevation between the respective post sleeves. If the mounting bracket 354 that is coupled to the higher of the two spider frames is aligned with the zero position at the bottom of the corresponding scale 223, the value indicated at the opposite mounting bracket will be the actual difference in elevation between the post sleeves. Otherwise, it is a simple matter of subtraction to obtain the correct value.

The hinge knuckle 350 of the mounting fixture 318 is provided with an additional encoder that is configured to read the scale 223 of the Z-axis index 222 and provide a signal corresponding to the vertical position of the mounting bracket 318 on the index, and the metering circuit is configured to derive a relative elevation difference of the post sleeves on the basis of signals from encoders at the first and second ends 205, 207 of the spacing beam, to establish the relative elevation difference.

Laser distance finders are coupled to the ends of the spacing beam 204 in proximity to the coupling pin 352, and configured to provide a signal corresponding to a distance from the mounting bracket to a plate at the base of the Z-axis index, from which the elevation difference can be derived.

Installation of a number of post sleeves, for a fence run, for example, will now be described with reference to FIG. 2. To differentiate between the elements of the spider frames 202a and 202b in the description, references to elements of the spider frame 202a will include the character "a," while references to elements of the spider frame 202b will include the character "b."

The basic layout of the fence is first established. This generally involves determining the location of the main posts, and the appropriate spacing between the line posts. A fence line is then established. This is traditionally done by running a string line parallel to the fence line some short specific distance away, which permits the installer to build the fence without interfering with the line, but having the line available for reference. It is becoming more common for a contractor to use a laser plane projector, such as is used in many of the construction trades, to project a vertical plane along the fence line. The installer starts at the far end and works toward the projector, using the vertical line projected by the device to align the fence.

To install a number of post sleeves, an installer user first provides post holes at the general locations where the post sleeves are to be installed. A first post sleeve 206 is positioned in the X, Y, and Z axes using a first spider frame 202a, substantially as described above. The spider frame 202a is locked in orientation and all axes, oriented and aligned with the centerline of the fence line. The footing of the first post sleeve is then poured.

A second spider frame 202b is positioned over the adjacent post hole with a second post sleeve attached. The second spider frame 202b is leveled and the second post sleeve is correctly positioned in the Z axis. The second spider frame 202b is locked in the z axis only, being otherwise free to move and rotate. Evaluating the two post sleeves, the installer determines which is at a higher elevation, which, in FIG. 2, is the sleeve of spider frame 202b. Using support saddles 227 on the most nearly mutually facing faces 229 of the Z-axis indexes 222 of the spider frames 202a, 202b, the installer sets the higher sleeve's saddle 227 to the zero position, and sets the opposing saddle 227 to approximately or exactly the same elevation. This can be done with a laser level or vial level, etc. The spacing beam 204 is then set to the desired length, and its first end 205 is coupled to the saddle 227 of the first spider frame 202a. With the X and Y axes and rotation of the second spider frame 202b unlocked, the second spider frame 202b is manipulated until the second end of the spacing beam can be coupled to the saddle 227 of the second spider frame 202b. The level of the spacing beam 204 is adjusted, if necessary, by moving the mounting bracket of the lower (202a) of the spider frames until the beam is perfectly level.

The second spider frame 202b is then brought into proper alignment with, and centered on, the fence line, with the column assembly 210b floating in the X and Y axes and rotation, to permit alignment and any final adjustments of the beam length. With the spacing beam 204 set and level, and the column assembly 210b correctly positioned in the X and Y axes and in orientation, the installer engages the respective locks, then pours the footing of the second post sleeve.

If the post sleeves are being installed to a prepared plan that sets forth specific values, the values will have been confirmed before and after the footing is poured, and are thus known. If the sleeves are being installed according to a more general plan, in which, for example, the distances between fence posts have been substantially predetermined, but other parameters are to be established on site, data from the spider frames and spacing beam is collected immediately after the footing is poured, including distance, relative orientation, and relative elevation.

One of the advantages provided by the aforementioned systems is that post sleeves can be installed according to very precise position and orientation requirements. This is advantageous when using fence panels that are manufactured before the sleeves are installed, because the size and shape of the panels are already fixed. However, another advantage is that, where the fence panels will be manufactured after sleeve installation, sleeves can be installed with a certain degree of latitude, because, however inexact the installation may be, the exact values of the relative positions and orientations of the sleeves are obtained once the sleeves are emplaced. This permits an installer to work much more quickly than would be possible when installing to very precise values, while still being able to obtain accurate values for the manufacturer of the panels.

Each post sleeve may be provided with a unique identifier (UI). This can be a factory-installed serial number (e.g., a 5 digit alphanumeric serial number), barcode, or reference marking, which can be printed, embossed, or otherwise placed on the post sleeve or on the footing as the sleeve is installed, some reference marking on a plat map, GPS coordinates, etc. In some cases, the unique identifier can be provided by an RFID device within the post sleeve. In any case, these identifiers are recorded with the collected data so that the correct fence panel can be manufactured and installed. Each post to be installed within a respective fence post sleeve can be provided with its own unique identifier matching the unique identifier of the fence post sleeve within which it is to be installed. Each fence panel to be installed between two fence posts can be provided with its own unique identifier, which can be a combination of the unique identifiers for the fence posts between which it is to be installed (e.g., the unique identifiers for the fence posts can be combined and separated by a hyphen). The order in which the unique identifiers for the fence posts are combined can signify the orientation of the fence panel in the field. For example, the fence panel can be oriented in the field so that its right side, when viewed from the fence post of the first unique identifier to the fence post of the second unique identifier, faces outward with respect to a fenced-in region (or in an alternative implementation, inward).

Once the data has been collected, the user decouples the spacing beam 204 from the first and second spider frames and repeats the process by positioning a third post sleeve coupled to a third spider frame in a hole prepared adjacent to the second post sleeve, with the second spider frame now fixed in position and the third spider frame being adjusted accordingly.

An installer may work with as few as three or four spider frames, while all but the shortest fences will have many more posts to be installed. Accordingly, once the available spider frames have been used, the user tests the oldest of the footings for firmness of the concrete, and when safe, moves that spider frame to the newest hole. Depending on how fast the concrete sets and how fast the installer works, it may be necessary to use three to six spider frames to efficiently install any number of post sleeves, leapfrogging each from the back of the line to the front as the concrete in each hole sets.

As each post sleeve is positioned, data necessary to manufacture a fence panel for that location is collected from the spacing beam 204, including the exact distance between the post sleeves, the relative orientation of the post sleeves, and the relative elevation of the post sleeves.

The data can be collected in a number of different ways. For example, the installer can merely read the values from the spacing beam 204 and Z-axis index, and write them down or enter them into a recording device. Alternatively, the spacing beam 204 can be provided with a metering device that includes a transmitter, configured to transmit the relevant data to a receiver that saves the data for each panel. Post identification data can also be collected automatically or manually. Each post sleeve can be provided with a unique bar code identifier or RFID tag that the user scans to enter.

The user sends the data for the fence to a central data repository and/or a manufacturer, who then manufactures all of the panels, marks each panel with the appropriate information to identify the post sleeves supporting the posts between which it will be attached, and ships the panels back to the user. The manufacturer may also cut posts to the correct lengths and ship those, as well. The user then correlates the markings on the posts and panels to the unique identifier of the post sleeves, and then places the fence posts in the corresponding post sleeves and installs each fence panel between the designated pair of posts.

As the data is collected, it may be immediately uploaded to the repository or manufacturer via a cellular or web connection, allowing production of the panels to begin as the sleeves are being installed.

The positions and spacing of the fence posts may be determined in advance, and the fence panels are preordered. In this case, the user installs the post sleeves from a specific plan, and positions the posts precisely as required to receive the panels. In such a case, it becomes necessary to perform at least a basic survey of the property to establish overall dimensions and elevations. In a similar way, a user can install mass-produced fence panels at their standard spacing.

Post positioning systems have been disclosed that employ spider frames with adjustable legs for positioning post sleeves. However, in some instances, a motorized system may be provided in lieu of adjustable legs or other structures, which is self-propelling, using wheels, or tracks similar to those of a bulldozer, and that includes a post sleeve attachment, as well as systems for manually or automatically positioning, orienting, and plumbing a post sleeve. The system can be configured to be operated by direct or remote control of an operator, or to be preprogrammed so as to move automatically from one position to the next, guided by GPS, or by reference to a fixed position, such as a transmitter or a surveyor device, or by other known systems or methods.

Figure 9:
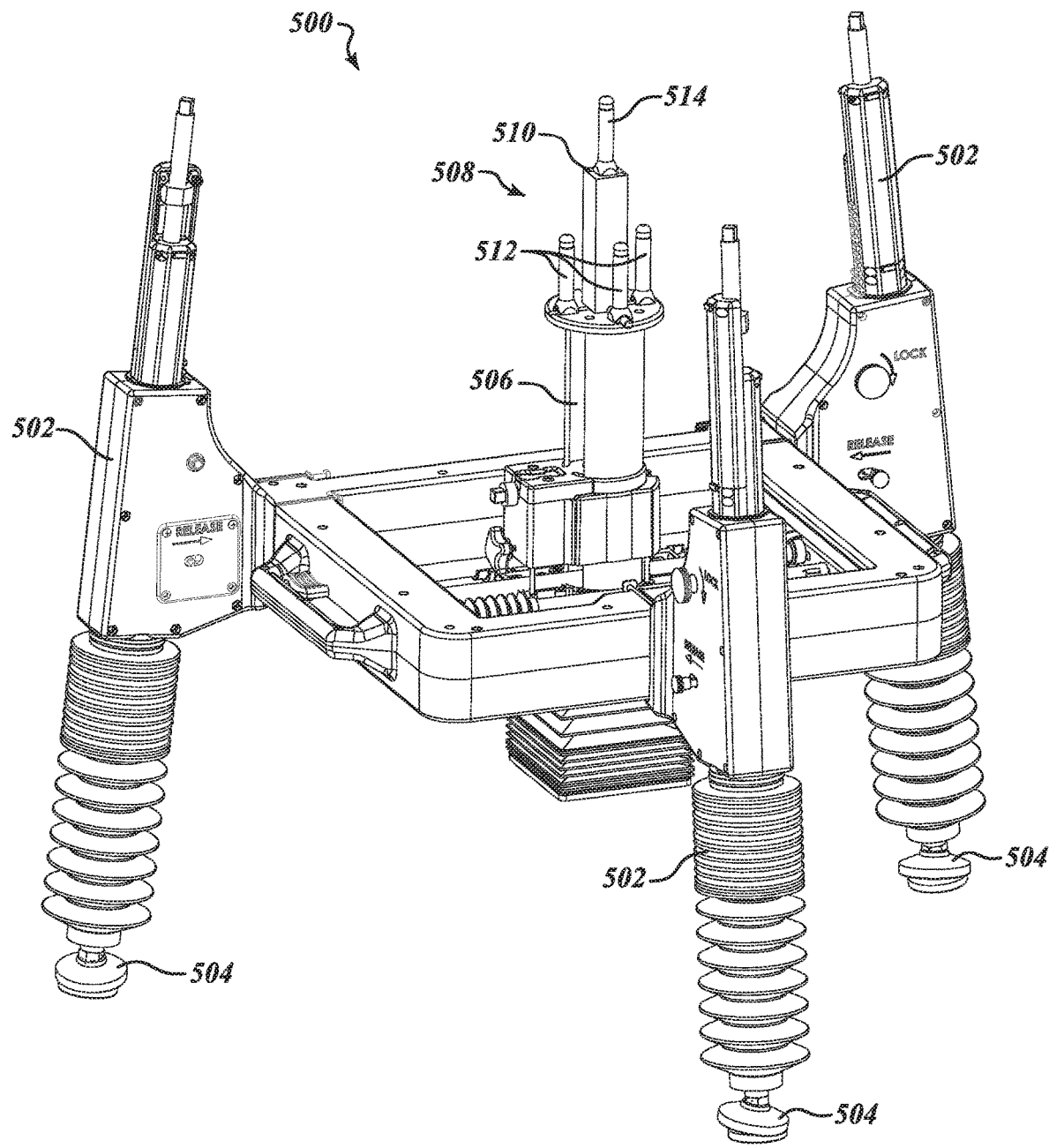
FIG. 9 shows a post sleeve installation device for use in a post sleeve positioning system, according to at least one illustrated embodiment.
Figure 10:
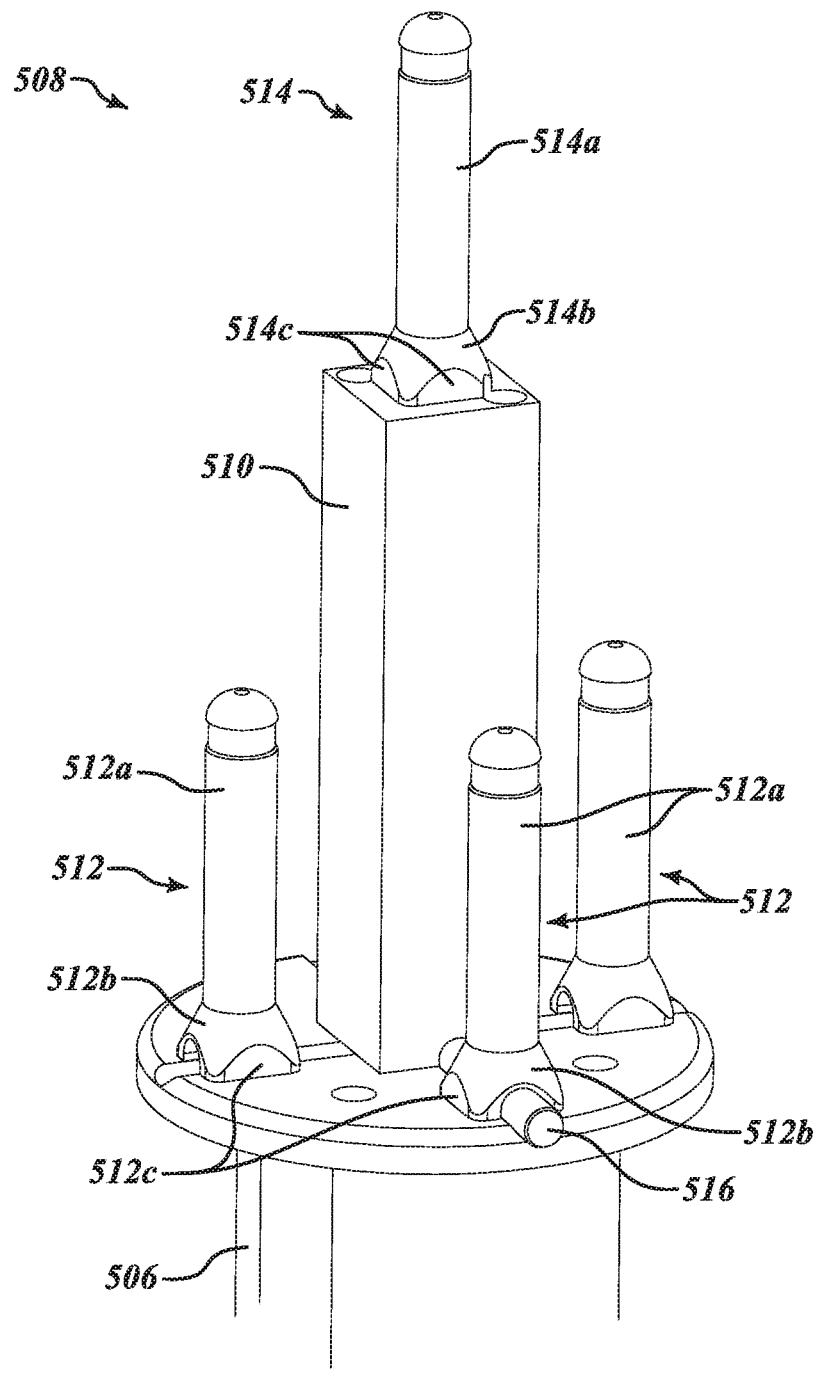
FIG. 10 shows components of the post sleeve installation device of FIG. 9 at a larger scale, according to at least one illustrated embodiment.

FIGS. 9 through 15 illustrate embodiments including post sleeve installation devices and spacing beams that can be coupled to one another to form a post sleeve positioning system in which the spacing beam can be oriented at any angle with respect to the post sleeve installation devices. Thus, in the post sleeve positioning systems illustrated in FIGS. 9 through 15, the spacing beam need not be level during use, and rather can be oriented at any desired pitch or incline. FIGS. 9 and 10 illustrate an embodiment of a spider frame or post sleeve installation device 500 for use in a post sleeve positioning system. With the exception of the features of the post sleeve installation device 500 described herein, the post sleeve installation device 500 can comprise components and features similar or identical to those of the post sleeve installation devices or spider frames 202 described above with reference to FIGS. 2 through 8. FIGS. 11 through 15 illustrate another embodiment of a spacing beam 600 for use with the post sleeve installation device 500 (or a plurality of post sleeve installation devices 500) in a post sleeve positioning system. With the exception of the features of the spacing beam 600 described herein, the spacing beam 600 can comprise components and features similar or identical to those of the spacing beam 204 described above with reference to FIGS. 2 through 8.

As shown in FIG. 9, the post sleeve installation device 500 can include three legs 502 having components and features similar or identical to those of the legs 214 described above with reference to FIGS. 2 through 8. For example, the legs 502 can include adjustable feet 504 by which the post sleeve installation device 500 can be positioned level over a post hole regardless of the terrain. Using three legs 502 rather than four legs 214 can simplify the post sleeve installation device 500, thereby reducing expense, and can simplify the process of levelling the post sleeve installation device 500 over a post hole. The post sleeve installation device 500 also includes a Z-axis spacer 506 similar to the Z-axis spacer 226 described above with reference to FIGS. 2 through 8.

As shown in greater detail in FIG. 10, the post sleeve installation device 500 also includes a coupling assembly 508 coupled to the top end portion of the Z-axis spacer 506, which can be used to couple the post sleeve installation device 500 to one or more spacing beams 600. The coupling assembly 508 can include a central vertical extension shaft 510 coupled to and extending vertically away from the top of the Z-axis spacer 506, and a central coupling shaft 514 coupled to and extending vertically away from the top end portion of the vertical extension shaft 510. The coupling assembly 508 can also include a plurality of peripheral coupling shafts or protrusions 512 coupled to and extending vertically away from the top of the Z-axis spacer 506.

The coupling assembly 508 is shown in FIGS. 9 and 10 as having three coupling shafts 512, but can include four peripheral coupling shafts 512 that are equidistantly spaced apart from one another around the vertical extension shaft 510, and that can be positioned to correspond to four surfaces of a square orifice of a post sleeve to be installed using the post sleeve installation device 500. The peripheral coupling shafts 512 can be coupled to the top of the Z-axis spacer 506 at respective locations forming the corners of a square. The peripheral coupling shafts 512 can be coupled to the top of the Z-axis spacer 506 at respective locations spaced apart from one another by 90° along a circle having a center coincident with the central longitudinal axis of the vertical extension shaft 510. In other implementations, the coupling assembly 508 can include any suitable number of coupling shafts, such as a single one or exactly two, three, five, six, eight, or more coupling shafts.

The coupling shafts 512 and 514 can have any suitable cross-sectional shape(s), such as circular, oval, elliptical, triangular, rectangular, square, pentagonal, or other cross-sectional shapes. In some embodiments, however, it can be particularly advantageous for the coupling shafts 512 and 514 to include upper cylindrical portions 512a, 514a having circular cross-sectional shapes, and lower base portions 512b, 514b having shapes including truncated spheroids. For example, each of the lower base portions 512b and 514b can have a shape including a prolate spheroid that is truncated at its top, where it meets the upper cylindrical portion 512a or 514a, and truncated at each of its four sides 512c or 514c. Thus, the base portions 512b and 514b can taper from a relatively wide bottom end, having a cross-sectional shape comprising a square or a square with rounded corners, upward toward a top end having a cross-sectional shape comprising a circle matching the circular cross-sectional shape of the upper cylindrical portion 512a or 514a. In some implementations, the coupling assembly 508 includes a cylindrical rod 516 seated between an upward facing semi-circular groove in the top of the Z-axis spacer 506 and a downward facing semi-circular groove in the bottom of the coupling shafts 512. The cylindrical rod 516 can have a central longitudinal axis that is perpendicular to, and that intersects with, a central longitudinal axis of the Z-axis spacer 506 such that it points toward the center of the post sleeve installation device 500. An additional advantage provided by the cylindrical rod 516 is described further below.

The vertical extension shaft 510 has a square cross-sectional shape, but in other implementations can have any suitable cross-sectional shape. The edges of the square cross-sectional shape of the vertical extension shaft 510 are aligned with or substantially parallel to the edges of the square cross-sectional shapes of the bottoms of the coupling shafts 512 and 514, and all of these edges can be spatially representative of a square post to be installed within a square post sleeve installed using the post sleeve installation device 500. The coupling shaft 514 has a central longitudinal axis coincident with a central longitudinal axis of the vertical extension shaft 510, which is coincident with a central longitudinal axis of the Z-axis spacer 506, which can also be coincident with a central longitudinal axis of a post sleeve when the post sleeve is coupled to the post sleeve installation device 500. The coupling shafts 512 can have respective central longitudinal axes that are parallel to the central longitudinal axis of the Z-axis spacer, and that are offset from the central longitudinal axis of the Z-axis spacer by well-defined distances. The coupling shafts 512 and 514 can be positioned at well-defined elevations above a post sleeve when the post sleeve is coupled to the post sleeve installation device 500.

Figure 11:
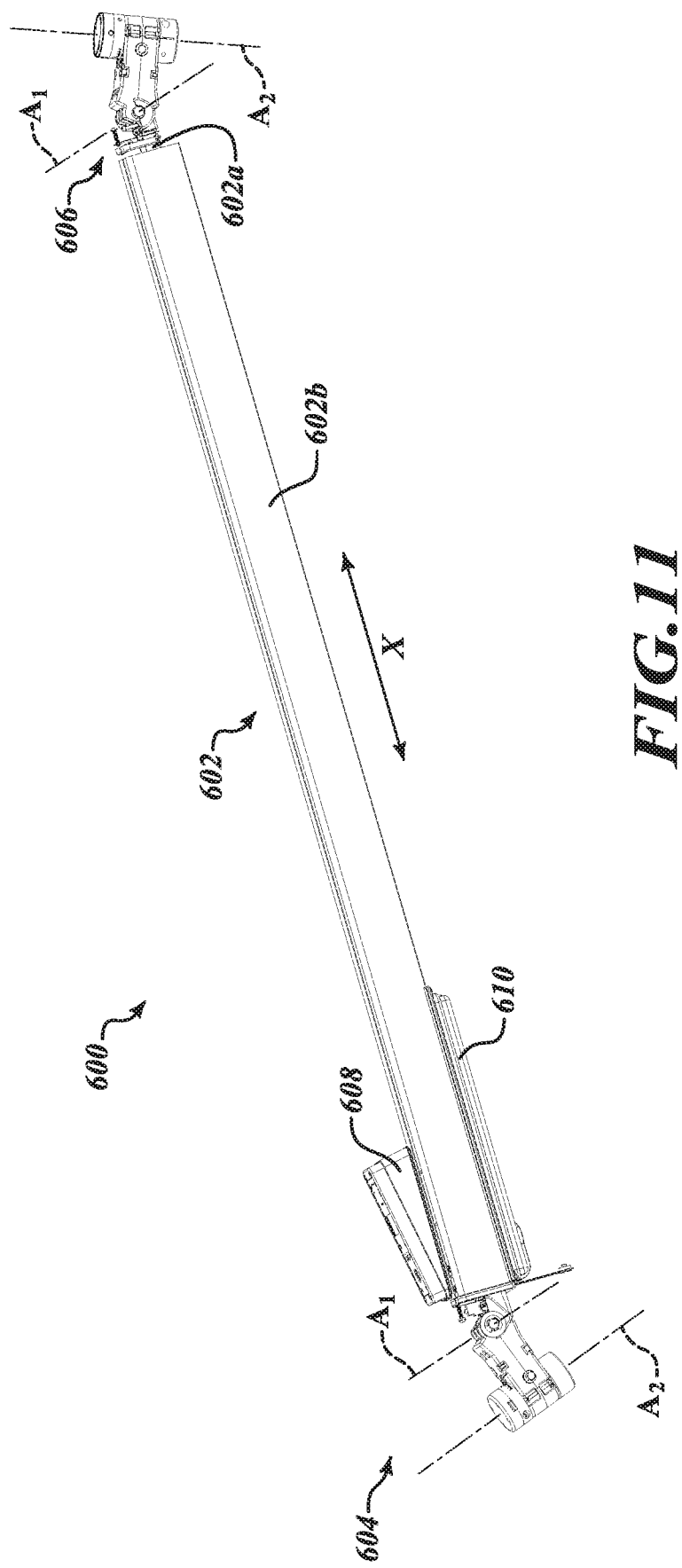
FIG. 11 shows a spacing beam for use with the post sleeve installation device of FIG. 9, according to at least one illustrated embodiment.
Figure 12:
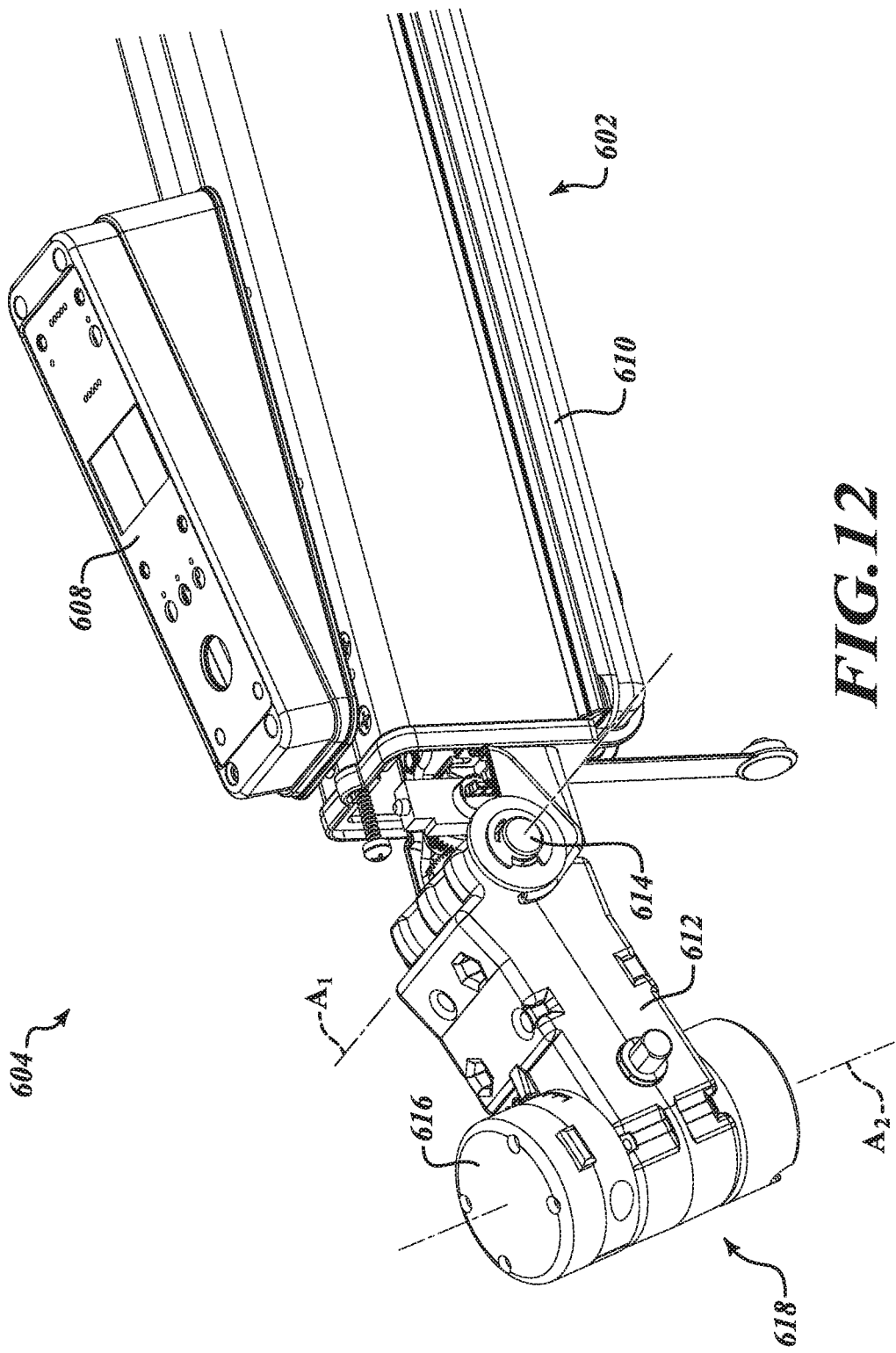
FIG. 12 shows a top perspective view of components of the spacing beam of FIG. 11 at a larger scale, according to at least one illustrated embodiment.

FIG. 11 illustrates that the spacing beam 600 can include a telescoping main body 602, a first end 604, and a second end 606 spaced apart from the first end 604 across the length of the main body 602. The spacing beam 600 can also include a controller 608 mounted to the top of the main body 602 and a power supply 610 mounted to the bottom of the main body 602. FIG. 12 illustrates some components of the spacing beam 600, including the first end 604 of the spacing beam 600, in greater detail. As shown in FIG. 12, an end of the main body 602 can be coupled to a knuckle portion 612 at a hinge 614, and the knuckle portion 612 can be coupled to a rotatable member 616 at a joint 618.

The first end 604 of the spacing beam 600 can be configured such that, when the spacing beam 600 is in use, a pivot axis $A_1$ or central longitudinal axis of the hinge 614 is horizontal and perpendicular to a central longitudinal axis of the main body 602, and such that a pivot axis $A_2$ or central longitudinal axis of the joint 618 is vertical and perpendicular to the pivot axis of the hinge 614. Thus, when the spacing beam 600 is in use, the joint 618 can allow the main body 602 to rotate horizontally or yaw about a vertical axis $A_2$, and the hinge 614 can allow the main body 602 to rotate vertically or pitch up and down about a horizontal axis $A_1$. The joint 618 can include a radial or rotary encoder that measures the angular position of the knuckle 612 with respect to the rotatable member 616 and outputs an analog or digital signal corresponding to this angular position, which can also correspond to a bearing of the main body 602. The hinge 614 can also include a radial or rotary encoder that measures the angular position of the knuckle 612 with respect to the main body 602 and outputs an analog or digital signal corresponding to this angular position, which can also correspond to a slope of the main body 602. The telescoping main body 602 can also include a linear encoder that measures the length of the main body 602 along a longitudinal axis X, based on the relative positions of an inner body 602a and an outer body 602b of the main body 602 (see FIG. 11), and outputs an analog or digital signal corresponding to this length. The encoders described herein can be absolute or incremental encoders.

The second end 606 of the spacing beam 600 can have components and features corresponding to and matching those of the first end 604 of the spacing beam 600, or otherwise similar thereto. In some cases, the second end 606 includes a radial or rotary encoder in its hinge or joint to act as a check on the measurement from the encoder in the hinge 614 and/or joint 618. In other instances, the second end 606 does not include an encoder in its hinge or joint to reduce expense and complexity.

Figure 13:
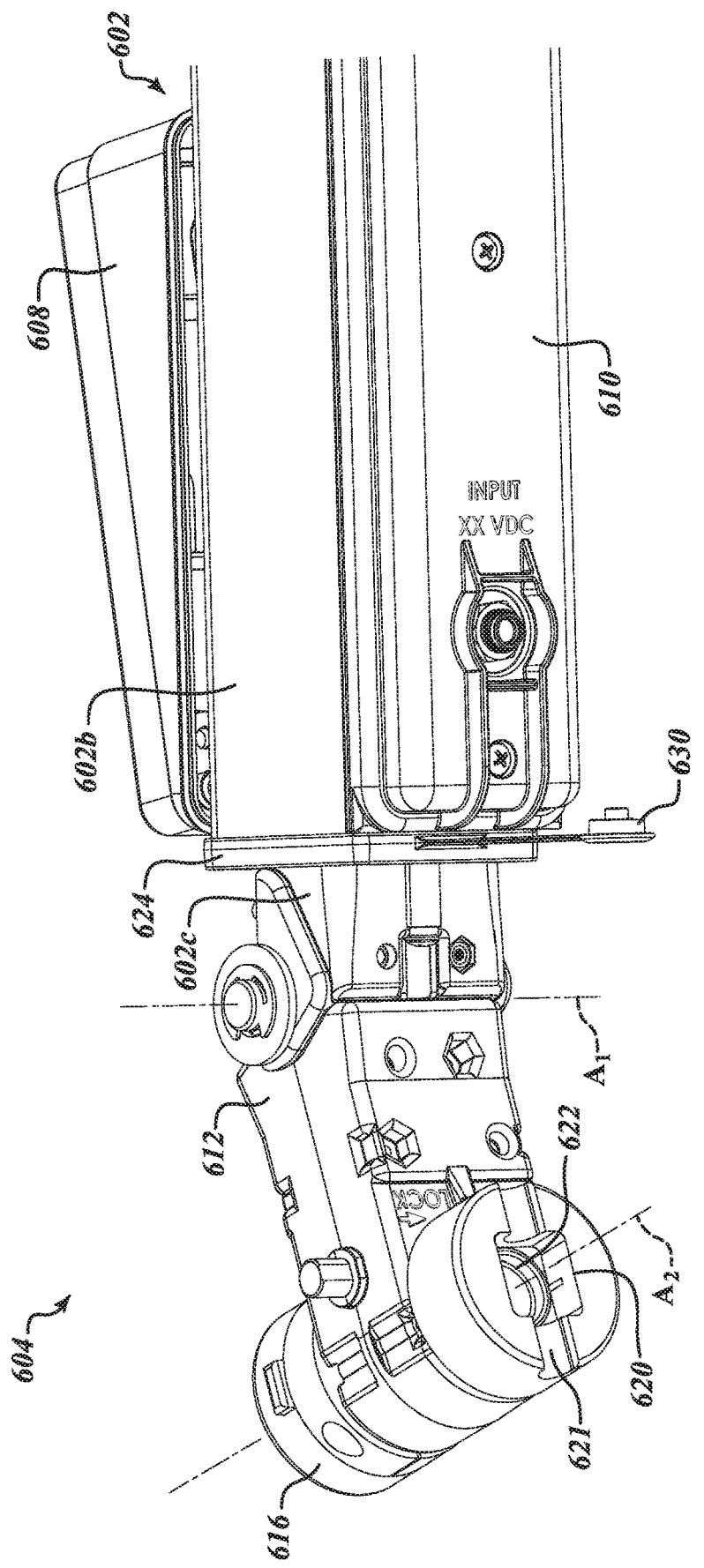
FIG. 13 shows a bottom perspective view of components of the spacing beam of FIG. 11 at a larger scale, according to at least one illustrated embodiment.

FIG. 13 shows the bottom of some of the components of the example embodiment of the spacing beam 600 shown in FIGS. 11 and 12. For example, FIG. 13 shows that the rotatable member 616 includes an opening or mouth 620 to an internal cavity 622 of the rotatable member 616. The opening 620 can have shape comprising a square or a square with rounded corners that matches the shape of the bottom of the coupling shafts 512 and 514. The internal cavity 622 can have a circular cross-sectional shape that matches the cross-sectional shape of the upper cylindrical portions 512a, 514a of the coupling shafts 512 and 514. Thus, the opening 620 and internal cavity 622 of the spacing beam 600 can be snugly mated or coupled to one of the coupling shafts 512 or 514 of the post sleeve installation device 500, such that the rotatable member 616 is rotationally locked to the post sleeve installation device 500. A central longitudinal axis of the opening 620 can be coincident with a central longitudinal axis of the cavity 622, as well as with a central longitudinal axis of the rotatable member 616 and an axis of rotation of the joint 618. The opening 620 can also include a downward-facing semi-circular groove 621 having a central longitudinal axis that intersects, and that is perpendicular to, the central longitudinal axis of the rotatable member 616 and the axis of rotation of the joint 618. The groove 621 can snugly mate with the portion of the cylindrical rod 516 that extends above the top of the Z-axis spacer 506.

FIG. 13 also shows a gasket 624 between a knuckle extension 602c and the outer body 602b of the main body 602. The gasket 624 can be coupled to the main body 602 to seal the knuckle extension 602c to the outer body 602b. A plug 630, illustrated in an unplugged configuration to more clearly illustrate its features, can be coupled to the gasket 624 or formed integrally therewith, and can be used to plug a jack of the power supply 610 when the power supply 610 is not in use, such as to prevent or reduce the ingress of contaminants through a connector of the power supply 610.

Figure 14:
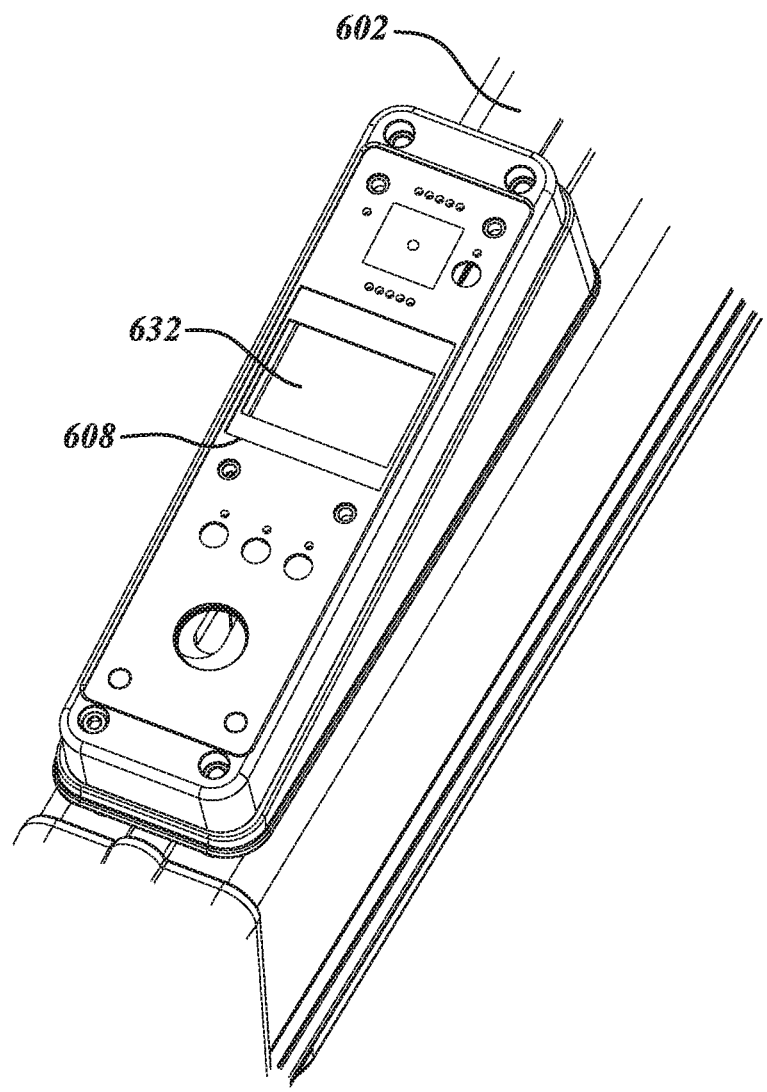
FIG. 14 shows another top perspective view of components of the spacing beam of FIG. 11 at a larger scale, according to at least one illustrated embodiment.
Figure 15:
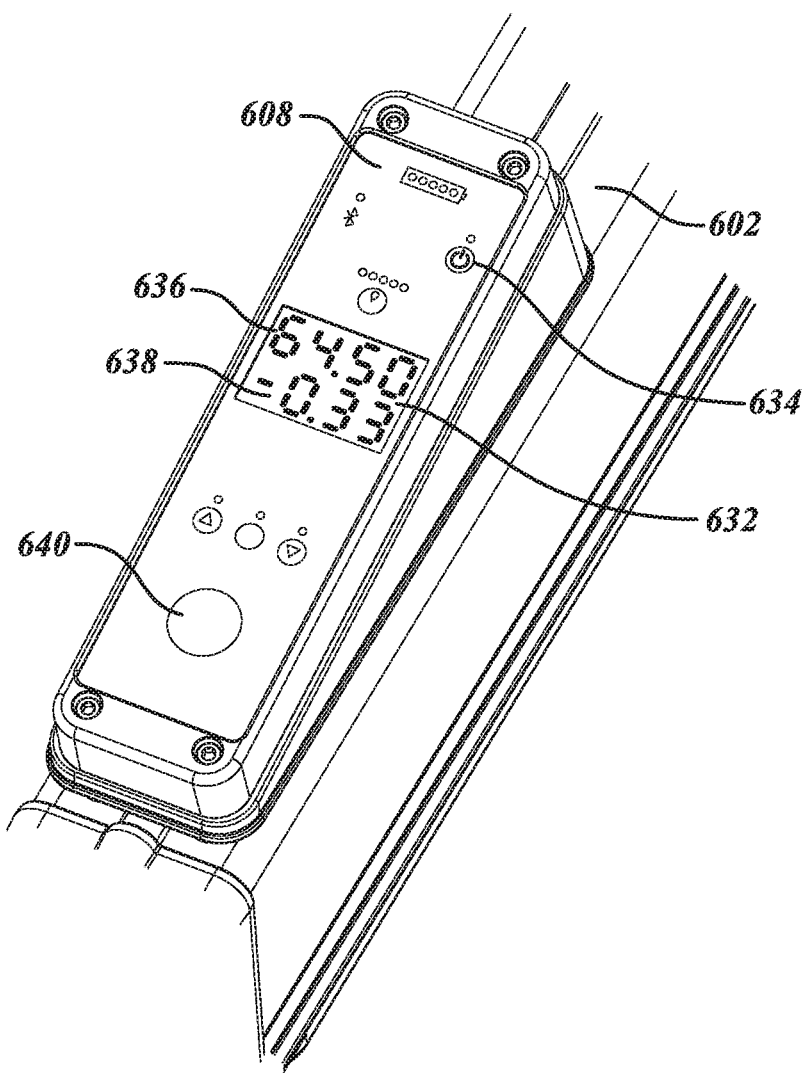
FIG. 15 shows an image of components of the spacing beam of FIG. 11, according to at least one illustrated embodiment.

FIGS. 14 and 15 show the controller 608. The controller 608 can include a power button 634, and can include internal circuitry to receive power from the power supply 610 and to receive the signals corresponding to the angles of rotation of the hinges 614 and the joints 618, and to the length of the main body 602, of the spacing beam 600. The controller 608 can also include a central processing unit and a display positioned at 632 to process the signals and output results of the processing to a user. For example, based on the signals received by the controller 608, the controller 608 can compute x-, y-, and z-coordinate distances (e.g., north-south, east-west, and elevation coordinate changes) between a first post sleeve coupled to a first post sleeve installation device 500 coupled to the first end 604 of the spacing beam 600 and a second post sleeve coupled to a second post sleeve installation device 500 coupled to the second end 606 of the spacing beam 600.

In some implementations, based on the signals received by the controller 608 and using geometry and trigonometry, the controller 608 can compute a distance, bearing, and elevation change between two post sleeves. The display can present numbers to a user, such as a horizontal distance 636 between two post sleeves and a change in elevation 638 between the two post sleeves, which can be signed to indicate whether the spacing beam is oriented uphill or downhill. As an example, a positive change in elevation 638 can indicate that the first end 604 of the spacing beam 600 is located at a higher elevation than the second end 606 of the spacing beam 600. The controller 608 can also include a light 640 that lights up when the spacing beam 600 is closer to level than an acceptable threshold amount.

The results can be output to a user visually at the display positioned at 632, and the controller 608 can also include USB port, Bluetooth and WiFi hardware and software, or other wireless communication devices, to communicate the results to a mobile computing device, such as a laptop computer or a smart phone. For example, FIG. 16 shows a photograph of a user interface of a cell phone for use with the systems described herein, and illustrates that the user interface can display a length and height distance between two adjacent fence post sleeves, the tilt and angles measured by the inclinometer and encoders discussed herein, latitude and longitude coordinates for the location, and a time the measurement was taken. The mobile computing device can relay the information to a database stored at any location, such as over the internet or other network. The controller 608 can also include a highly sensitive and highly accurate inclinometer that senses the slope of the main body 602 of the spacing beam 600, a compass, and Global Positioning System ("GPS") hardware and software that can obtain the location of the controller 608.

A signal generated by the inclinometer can be used as a check of or as a replacement for the signal from the rotary encoder corresponding to the slope of the main body 602. In some cases, the signal from the rotary encoder corresponding to the slope of the main body 602 (e.g., from a rotary encoder at the hinge 614) can be compared to the signal generated by the inclinometer and a difference between these two measurements can indicate a degree to which a post sleeve installation device 500 coupled to the main body 602 (e.g., by the hinge 614) is out of plumb. In particular, the signal from the inclinometer can indicate the true slope of the main body 602 and the difference between the measurements can indicate the degree to which the post sleeve installation device 500 deviates from vertical. The measurement of the degree to which the post sleeve installation device 500 is out of plumb can be used by an installer to plumb the post sleeve installation device (e.g., by adjustment until this measurement is zero) or can allow a fence panel manufacturer to manufacture fence panels to be installed using out-of-plumb post sleeves.

A signal generated by the compass can be used to determine a bearing of the main body 602, such as to provide a check of the signal from the rotary encoder corresponding to a bearing of the main body 602. The signals from the rotary encoders corresponding to the bearing and slope of the main body 602, the compass data, and/or the GPS data can be used to display the location and bearing of a software-developed fence system or the main body 602 and post sleeve installation devices 500, or post sleeves installed in the ground on a map of the region where the fence is to be installed. The controller 608 can also include a thermometer that can output a signal corresponding to an environmental temperature, which can be used to compensate, when computing measurements, for changes to dimensions of components of the system resulting from changes in the environmental temperature at the time of installation.

Methods of using a post sleeve positioning system including a plurality of post sleeve installation devices 500 and the spacing beam 600 can be similar to other methods described elsewhere herein. In one example method, a user can use a first post sleeve installation device 500 to position and install a first post sleeve. The user can then determine the absolute location of the first post sleeve, such as by using the GPS components of the post sleeve positioning system, a separate GPS device, or by traditional survey methods. The user can then use a second post sleeve installation device 500 to position a second post sleeve. The user can then use a first spacing beam 600 to measure the relative locations of the first and second post sleeves, and can adjust the location of the second post sleeve until the user determines, using the first spacing beam 600, that the relative locations of the first and second post sleeves are suitable. The user can then install the second post sleeve and record the relative locations of the first and second post sleeves, and thus also the absolute location of the second post sleeve. Data representing any of the raw measurements described herein, and/or the relative locations of the first and second post sleeves, can be communicated from the controller 608 to the mobile computing device, and from the mobile computing device to the database, or from the controller 608 directly to the database.

The method can progress and the steps can be repeated in any suitable order. For example, a user can use a third post sleeve installation device 500 to position a third post sleeve, and the user can then use the first spacing beam 600 or a second spacing beam 600 to measure, adjust if necessary, and record the relative locations of the second and third post sleeves. Alternatively, the user can remove the first post sleeve installation device 500 from the first post sleeve and use the first post sleeve installation device 500 to position a third post sleeve, and then use the first spacing beam 600 or a second spacing beam 600 to measure, adjust if necessary, and record the relative positions of the second and third post sleeves.

In another example method, a user can use a post sleeve installation system including a plurality of post sleeve installation devices 500 and the spacing beam 600 to position post sleeves at predetermined locations. For example, the user can couple a first post sleeve to a first post sleeve installation device 500 and use the post sleeve installation system and GPS components included therein, a separate GPS device, or traditional survey methods to position and install the first post sleeve at a predetermined location to within suitable tolerances. The user can then couple a second post sleeve to a second post sleeve installation device 500 and couple the spacing beam 600 to the first and second post sleeve installation devices 500. The user can then use the output provided by the controller 608 to adjust the position of the second post sleeve until the position of the second post sleeve matches a predetermined location for the second post sleeve to within suitable tolerances. The user can repeat these steps in any suitable order for any desired number of post sleeves.

If the user encounters an especially steep grade such that the vertical rotation of the spacing beam 600 allowed at the hinge 614 is insufficient to accommodate the change in elevation between two adjacent post sleeve installation devices 500, then the user can couple one end of the spacing beam 600 to a coupling shaft 512 of the higher of the two post sleeve installation devices 500 and the other end of the spacing beam 600 to the coupling shaft 514 of the lower post sleeve installation device 500. The vertical extension shaft 510 can have well-defined dimensions including a well-defined height, such as a height of six inches, and can act as a vertical offset to allow a post sleeve installation system to traverse steeper grades than would be allowed without the vertical extension shaft 510. The user can provide input to the controller 608, e.g., manually or via a sensor trigger on the coupling shaft 514, to indicate that the system is being operated in such a manner, so the controller can modify its geometric or trigonometric calculations accordingly.

If the user couples multiple spacing beams 600 to one post sleeve installation device 500, the user can couple the spacing beams to any suitable combination of the coupling shafts 512 and 514. For example, to install post sleeves for fence posts of a single fence run, the user can couple a first spacing beam 600 to a first coupling shaft 512 and a second spacing beam 600 to a second coupling shaft 512 opposite to the first coupling shaft 512 across the vertical extension shaft 510, which can be representative of opposing sides of a fence post to eventually be installed in that location, such that two of the coupling shafts 512 are spaced apart from one another by 180°. As another example, to install post sleeves for fence posts at a location where one fence run meets another (e.g., at a corner of a fence), the user can couple spacing beams 600 to coupling shafts 512 of a fence post installation device 500 spaced apart from one another by 90°, which can be representative of adjacent or perpendicular sides of a fence post to eventually be installed in that location. As another example, to install post sleeves for fence posts at a location where one fence run intersects another fence run, the user can couple spacing beams 600 to three or four of the coupling shafts 512 of a fence post installation device 500.

A post sleeve installation system kit can include a plurality of fence post installation devices 500 and/or a plurality of spacing beams 600. For example, a kit can include exactly two fence post installation devices 500 and exactly one spacing beam 600. As another example, a kit can include multiple post sleeve installation devices 500 and multiple spacing beams 600, such as 5 to 8 post sleeve installation devices 500 and 3 to 5 spacing beams 600. In some cases, a kit can include multiple spacing beams 600 having different nominal lengths from one another, such as a first spacing beam having a minimum length of 33 inches and a second spacing beam having a maximum length of 96 inches. Providing a kit with spacing beams 600 of different nominal lengths can facilitate the placement of post sleeves at the ends of fence runs and in the region of gates in a fence run. In other cases, a kit can include multiple spacing beams 600 having different sensor configurations, such as three spacing beams 600 including the a radial encoder at the respective joints 618 and three spacing beams 600 not including a radial encoder at the respective joints 618, such as for use in installing straight fence runs.

Once a post sleeve is positioned within a post hole, the hole can be initially only partially back-filled using a fast-setting concrete, expansion foam, or other formulation of a hardenable material, so that the post sleeve installation devices 500 can be moved more quickly. A user can return later to finish back-filling the hole with a concrete formulation, expansion foam, or other hardenable material that is selected for strength and weatherability rather than setting speed. A first partial footing can be configured to set very quickly, with sufficient strength to hold a respective post sleeve in place, to permit the user to work more quickly using fewer post sleeve installation devices 500. Further, the material of the partial footing can be configured to have a selected porosity to permit water that enters the sleeve to percolate from the sleeve into the ground at a controlled rate.

Various devices and methods have been described for obtaining data regarding the relative positions of post sleeves, including elevation, orientation, and distance apart. It should be noted that in some cases, the only information necessary is distance and elevation, or even distance, alone. For example, if a fence is to include only straight lines and right angles, and the posts are to be square and aligned with the fence line, every fence panel will be perpendicular to the faces of the posts to which it is attached. Thus, orientation of each post need not be measured. This is also true if the posts are to be round, regardless of the path followed by the fence line. Likewise, if the fence is to follow a substantially level line, elevation need not be measured. Thus, while various implementations enable the collection and transmission of many classes of data, the scope of the claims also encompasses implementations in which only limited data is collected or transmitted.

Many of the disclosed implementations can be adapted for use with other post support mechanisms, such as, for example, post brackets, which are sometimes used to attach posts to existing surfaces. Furthermore, even in cases where posts are set in the ground by conventional means, without sleeves, custom fence panels can be manufactured as disclosed, if the necessary data is collected and transmitted to the manufacturer.

According to various implementations, as discussed above, data related to the positioning of the post sleeves of a fence are collected for use by a fabricator to make fence panels or kits in a factory environment that are "custom-made" for that fence. According to another implementation, a central data archive is provided, to which the data is also sent. By collecting and storing such information, it is preserved for access at any time in the future. For example, if a portion of a fence is damaged, the information is available to produce replacement panels with the same style, material, and finish as the original fence, even if the fence is a one-of-a-kind design. Any properly equipped fabricator can use the previously stored data to manufacture replacement panels that will perfectly match the original design. Furthermore, when a fence is to be completely replaced, it is not necessary to obtain new data unless the location of the fence also changes. Otherwise, new posts can be placed in the original post sleeves, meaning that the original data will still be valid.

Ideally, the central archive collects data from a very large geographical region, e.g., nationally. However, a number of different facilities can collect the information for respective smaller geographical areas, as well, such as by state or county. Archives can be maintained by any of a number of different entities, including, for example, local or national trade groups, for-profit companies, local governments or extension services, fabricators themselves, etc.

Nevertheless, there are some benefits that are obtained from centralized collection of the information. For example, statistical data can be obtained for evaluation of performance and durability of different post sleeve designs, materials, and installation methods, over extended periods, in many different environments. Also, with plural archives, it may be at times difficult to locate data for a given fence. Controlling entities can move or go out of business or consolidate; competing manufacturers could be reluctant to share data, etc. In contrast, if there is one central archive, there is never a problem locating the data, and it is more likely to remain current.

A fence installation process can be provided. Initially, a piece of property is surveyed and the property lines are defined. This can be in conjunction with the subdivision of a larger parcel, or by a developer who surveys all the lots of a housing development, etc. The locations of post sleeves are then determined. According to one implementation, a software program is provided that is configured to automatically select the positions and spacing of the post sleeves on the basis of the plot plan or survey data, and preferences entered by a user. For example, the user can define the maximum distance between posts or the maximum length of fence rails, and can select the locations of gates, runs, etc., which are shown on a site map that can be printed out for use by the installer. If the post sleeve installation system is configured to employ a post-to-post spacing format, like that described with reference to FIGS. 2-8, the locations of the fence and main posts are marked on the property by referring to the site map. The markings are general in nature, e.g., a string line, laser line, stakes, GPS, etc., to assist in initial positioning of the post holes and main post sleeves. The post holes are then dug and the sleeves are installed. Although the installer works from the site map and spacing previously set forth, the actual position and orientation of each post sleeve, relative to the adjacent sleeves, is determined and recorded by the installer. This ensures that small deviations from the prescribed positioning are recorded, so the fence panels will fit properly.

The post sleeves may be installed before other construction is begun, and perhaps even before the property is fully graded. The installer positions the post sleeves relative to the desired finish elevation, even if the ground where the post sleeves are installed is not yet at the finish grade level. In such a case, the contractor may thereafter use the pre-positioned post sleeves as markers when finish grading the property. This means that particular sleeves may be installed some distance above or below the current grade. To install below grade, of course, the installer merely digs a deeper post hole and places the sleeve at the correct level. To install more than a few inches above grade, the installer can use a commercially available concrete form (e.g., a Sonotube® form) to make a short column in which the sleeve is embedded. The sleeves can be capped to prevent dirt from falling inside, or marker flags can be placed in the sleeves so the graders can see them, for reference, and to avoid damaging them. The sleeves are positioned so that, when the property is at the finish grade, the sleeves (capped) are a few inches above the surface and ready to receive posts.

During installation of the post sleeves, information necessary for manufacture of the panels is collected, either automatically or manually, depending on the installation system used. This information is sent to a central archive, where it is assigned a file number and stored. The information provided by the post sleeve installer includes the locations of all of the post sleeves on the property, their relative positions and orientations, and the unique identifier of each sleeve. Additional information that can be provided includes, for example, the sleeve model and manufacturer, the grade of concrete used to install the sleeve, provisions made for drainage, depth of concrete, hole diameter, relative heading from neighboring sleeves, GPS coordinates, installation date, the installing contractor, and the current property owner. All of the measured GPS coordinates can be crossreferenced using the other measurements taken during installation to improve the overall accuracy of the GPS coordinates.

When a property owner, contractor, or developer is ready to install a fence, they can go to an internet-connected software system and input the relevant address. The program can search for stored data and render the 3-D post sleeve installation locations in a rotatable user interface. The user can then select from lists of options a fence material such as vinyl, a style such as lattice top, a minimum and a maximum height of the fence to allow the fence to follow a contour of the land, and a method by which the top of the fence would traverse the topography such as stair step, topography-following, concave, or convex finish. The software can render and price the fence system as the user makes selections and adapts the model to their liking. Once the user is satisfied, the user can consummate a sale and an order can be processed over the internet to the closest properly equipped manufacturer for manufacture of the fence and post system components. As the fence panels and posts are produced they can be marked with unique identifiers of the sleeves they are to be installed with, and the components can be shipped to the relevant address for installation or to an installer.

An installer removes storage caps from the tops of the sleeves, and places the posts in the corresponding sleeves, then attaches each panel to the appropriate posts, referring to the markings placed by the manufacturer on the fence components and the unique identifier of each post sleeve to correctly position each post and panel. The fence components can be installed by a contractor working for the developer or property owner, or a reasonably handy property owner can do the installation, unassisted.

In cases where the fence is installed by a developer when the property is first subdivided and developed, installation may be days, weeks, or months after installation of the post sleeves. The developer may install fence panels only along property lines around the perimeter of a development, while leaving the remaining post sleeves unoccupied but covered with form-fitting storage caps. If fences are not installed by the developer, some who later purchase lots may elect to install fences, while others may not. However, even years later, a second or third owner can choose to install a fence, and the sleeves will be waiting and the data still available at the archive. Furthermore, because the sleeves are installed according to the original survey when the property is subdivided, they can appear on later survey maps and in the legal description of the property, and can be used as visual reference markers to correctly define boundaries thereafter. Thus, installing the post sleeves can enhance the value of the property and assist in the sale of the original property by visually defining the property lines, regardless of whether a fence is actually installed at that time.

When an individual purchases a lot, the data is already on file, and the owner can consult with a contractor, a fabricator, or refer to a website such as the one described above to select a fence design, materials, finish, etc. The user can provide a file number or other information to identify the specific property, and the consultant or website software can then download the pertinent data from the central archive and produce a rendering of the property's installation locations, showing a fence in the selected design, or showing various options for the user to choose from. The software can allow the user to order a finished panel and post system or a do-it-yourself kit including the components and plans needed to build the panels on-site. Once the user has made a selection, the order can be placed immediately, by any appropriate means, including by telephone, email, web order, etc.

When a customer orders fence panels, a software system can automatically download the necessary data a fabricator's optimization and assembly system. If the fence style is one of a number of designs that are offered as standard by the fabricator, and if the extent of the data downloaded from the central archive is relative post sleeve positions, information specific to that style can be already present in the system, so that when an operator enters the information specific to the post sleeves of the customer's property, the system automatically calculates the numbers and dimensions of all the individual parts of each panel to be manufactured.

At any given time, the fabricator may have dozens of fence orders in queue. Lumber enters the system in random length boards according to the lengths of the stems from which they were milled, or as mill shorts. The system carries a running list of material yet to be cut for all the pending orders. As each board is fed into the machinery, the system scans it to determine its dimensions and to detect flaws, then calculates which of the list of pieces can be cut from the board to result in the least amount of waste, cutting the board accordingly. The system can also be configured to consider the structural strength necessary for a given piece. Thus, for example, a rail that will eventually span between two posts and support much of the weight of the panel, as well as wind load, etc., may need to be substantially clear of knots and checks, while a slat of a lattice, which will never be required to support more than a minimal load, can have a number of structural flaws, provided they don't detract from its appearance.

After cutting, each piece can be marked with a code that indicates the job, panel, and component, and is then sorted, at least by job. Marking can be by any of a number of known means, including stamping, laser, spray, RFID, etc. Alternatively, an inline sorting and tracking system can be enabled to memorize each component track through the assembly process without visual markings. One of the fence rails of each panel is also marked at each end with the unique identifier of the respective post sleeves between which that panel is to be installed. The fence posts are also marked with unique identifiers after they are cut to length. During installation, the installer will refer to these markings to determine the location of the particular posts and panels. If necessary, the marked portions can be covered by a clear wax or finish to prevent stain or paint that is later applied from obscuring the markings.

According to one implementation, assembly workers assemble all the components of each panel, referring to the markings to correctly assemble the components. The markings can be in a computer-readable format, such as bar codes, so that if a worker is unsure of where a particular piece of material belongs, its marking can be passed under a reader, and the system will indicate the panel and location of the piece. According to another implementation, the system automatically assembles at least portions of some or all of the panels, with workers doing final assembly. According to yet another implementation, in cases like continuous extrusion of vinyl fencing, a flying bridge saw can cut each piece of a desired fence panel in a continuous line being managed by a pick-and-place robot assembling the panels enabling a zero waste environment where even the vinyl shavings are returned back to the extrusion process for reuse.

Either before or after assembly of a wood fence, the components of the fence can be factory-finished, by dipping or spraying each component with a stain or paint finish selected by the customer. Once the finish has cured, the components are crated or banded for shipment. The panels and posts are preferably stacked and banded in order of position in the finished fence line, so that the installer can place a stack of panels on a cart or flatbed truck and, moving along the fence line, drop the correct panel and post at each position, in order. In most cases, there will be little or no waste at the fence site, apart from packing material, which itself will be minimal.

Over time, fence posts and panels will be damaged or will deteriorate. Replacement panels can be easily obtained using the system. Either the property owner or the manufacturer can obtain the data from the repository, including style, material, finish, and possibly detailed scaled images of the installed product during production. The customer merely indicates which panels and which posts need to be replaced, and the manufacturer can produce an identical panel from the original data, which is then shipped to the customer. If a single unique fence board needs to be replaced, it is possible to cut an exact match and ship the replacement. If posts need to be replaced, the old posts are pulled from the sleeves, which are then cleaned, if necessary, and the new posts are dropped in. The panels are then installed as previously described.

While fabrication of wood panels is described above, other materials, such as, but not limited to, plastics and metal, can also be processed similarly. This is especially true where, because of normal operations in related or unrelated industries, there is a surplus of materials that are normally scrapped, but that could be used in fence panels.

According to an implementation, the end consumer accesses a software program that provides all the necessary tools to select a fence design and place an order. The program may be accessed, for example, via the internet, at a retail location, or with the assistance of a contractor. The user can input an address or some other identifier such as tax lot number etc. If data related to that property is present in the central repository or in other accessible records, the program then populates with a 2- or 3-dimensional rendering of the property, according to the information and detail that is available. The rendering includes the current fence or previously installed post sleeves. The user selects materials, color and finish, style, and other details, all of which are displayed and described in the rendering, as they are selected. Information about manufacturers is provided, such as delivery times and prices. A running subtotal of the cost of the fence is provided, together with costs (or estimates) of delivery, installation, and tax, together with a total cost. The user is thus able to select and order a fence according to personal criteria, without outside assistance or interference, or whatever level of assistance or advice is desired. Once an order is placed, the system updates the central repository accordingly.

In a similar fashion, a user can select and order an individual replacement panel, inputting the unique identifier or identifying the particular panel from the 3D model or stored pictures. Additionally, the consumer can log on to the website, or otherwise access the system from time to time, to update the database to reflect changes, e.g., new stain colors, contractors used, etc., or to access the actual plot plan for future reference.

While devices configured for use in installing post sleeves may be recited in the claims, unless specifically recited as an element, post sleeve is not to be read as a claim limitation, i.e., if a claim reads on a device with a post sleeve attached, it will also read on the same device without the post sleeve.

References in the specification and claims to movement in or parallel to ordinal axes, such as the X, Y, or Z axis, do not refer to specific axes, but to three mutually orthogonal axes, except that reference to the Z axis can be understood as referring in particular to a vertical axis, while X and Y axes can be understood as lying in a horizontal plane. Reference to orientation is to be understood as referring to an angle of rotation around a vertical axis.

The term position refers to the location of an element in three orthogonal axes, unless explicitly limited further.

The term post is used in the specification and claims in relation to a vertical support member, such as is used, for example, to support a fence or sign, and is not to be construed as meaning subsequent to.

The term post bracket is used as a generic term to refer to hardware configured to support a post at or above a surface, including, for example, a bolt pattern plate, a "U" bracket, a pier bracket, and a post bracket. The term post receiver is used in the claims to refer generically to structures configured to receive and support a post, including, for example, prefabricated post sleeves, post brackets, and poured-in-place post sleeves (made using a post hole mold).

Adjustments made before coupling the post sleeve to a device can be read as adjusting the post sleeve. The abstract of the present disclosure is not intended as a complete or definitive description of any embodiment thereof, nor should it be relied upon to define terms used in the specification or claims. The abstract does not limit the scope of the claims.

Features and aspects of the various embodiments described above can be combined, and further modifications can be made, to provide further embodiments. All of the U.S. patents, U.S. patent application publications, U.S. patent applications, foreign patents, foreign patent applications and non-patent publications referred to in this specification and/or listed in the Application Data Sheet, including U.S. Pat. Nos. 7,861,434 and 8,011,149, U.S. Provisional Patent Application No. 62/306,988, filed Mar. 11, 2016, and U.S. patent application Ser. No. 15/453,725, filed Mar. 8, 2017, are incorporated herein by reference, in their entireties. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification, but should be construed to include all possible embodiments along with the full scope of equivalents to which such claims are entitled.

The invention claimed is:

1. A system for positioning post sleeves, the system comprising:
 a first post sleeve installation device configured to receive a first post sleeve;
 a second post sleeve installation device configured to receive a second post sleeve; and
 a spacing mechanism coupleable between the first and second post sleeve installation devices to determine or control an elevation of the first post sleeve relative to the second post sleeve, the spacing mechanism having an adjustable pitch.

2. The system of claim 1 wherein the spacing mechanism comprises a spacing beam configured to be coupled at a first end to the first post sleeve installation device and at a second end to the second post sleeve installation device.

3. The system of claim 1 wherein the adjustable pitch of the spacing mechanism enables the spacing mechanism to be oriented at a plurality of non-zero pitches.

4. The system of claim 1 wherein the spacing mechanism includes a main body having a first end and a second end opposite the first end, and wherein the spacing mechanism includes a hinge and a joint at the first end of the main body.

5. The system of claim 4 wherein the hinge has a horizontal pivot axis that is perpendicular to a longitudinal axis of the main body, and wherein the joint has a pivot axis that is perpendicular to the horizontal pivot axis of the hinge.

6. The system of claim 5 wherein the joint includes a first radial encoder to sense an angular rotation of the joint and the hinge includes a second radial encoder to sense an angular rotation of the hinge.

7. The system of claim 6 wherein the main body includes telescoping portions and a main body sensor configured to sense a change in length of the main body.

8. The system of claim 7, further comprising:
a controller configured to receive signals from the first and second radial encoders and the main body sensor and output data indicative of a position and an elevation of the first post sleeve installation device with respect to the second post sleeve installation device.

9. The system of claim 1 wherein the spacing mechanism includes a main body having a first end and a second end opposite the first end, and wherein the spacing mechanism includes a respective hinge and a respective joint at each of the first and second ends of the main body, each hinge having a horizontal pivot axis that is perpendicular to a longitudinal axis of the main body, and each joint having a pivot axis that is perpendicular to the horizontal pivot axis of the hinge.

10. The system of claim 1 wherein the first post sleeve installation device includes a vertical coupling shaft and an end of the spacing mechanism includes an internal cavity configured to receive the vertical coupling shaft.

11. The system of claim 10 wherein the vertical coupling shaft has a bottom end having a cross-sectional shape comprising a first square and the internal cavity has an opening having a cross-sectional shape comprising a second square corresponding to the first square.

12. The system of claim 10 wherein the first post sleeve installation device includes a plurality of vertical coupling shafts, and the end of the spacing mechanism is selectively coupleable to one of the plurality of vertical coupling shafts.

13. A method of installing fence post sleeves, comprising:
installing a first fence post sleeve using an installation device; and
adjusting an elevation of a second fence post sleeve relative to the first fence post sleeve using the installation device, the installation device including a spacing mechanism oriented at a non-zero pitch.

14. The method of claim 13 wherein adjusting the elevation of the second fence post sleeve includes determining, using a controller, the elevation of the second fence post sleeve relative to the first fence post sleeve based on a signal, received by the controller, corresponding to the non-zero pitch.

15. The method of claim 14, further comprising communicating a signal corresponding to the elevation of the second fence post sleeve relative to the first fence post sleeve to a remote database.

\* \* \* \* \*